(12) United States Patent
Chu et al.

(10) Patent No.: US 11,800,056 B2
(45) Date of Patent: Oct. 24, 2023

(54) SMART WEBCAM SYSTEM

(71) Applicant: Logitech Europe S.A., Lausanne (CH)

(72) Inventors: Joseph Yao-Hua Chu, Los Gatos, CA (US); Ting Chia Hsu, Hsinchu (TW); Jeffrey Phillip Fisher, Dublin, CA (US)

(73) Assignee: Logitech Europe S.A., Lausanne (CH)

( * ) Notice: Subject to any disclaimer, the term of this patent is extended or adjusted under 35 U.S.C. 154(b) by 326 days.

(21) Appl. No.: 17/174,189

(22) Filed: Feb. 11, 2021

(65) Prior Publication Data

US 2022/0256116 A1 Aug. 11, 2022

(51) Int. Cl.
*H04N 7/15* (2006.01)
*H04N 23/661* (2023.01)

(52) U.S. Cl.
CPC .............. *H04N 7/15* (2013.01); *H04N 23/661* (2023.01)

(58) Field of Classification Search
CPC ............................... H04N 7/15; H04N 23/661
See application file for complete search history.

(56) References Cited

U.S. PATENT DOCUMENTS

| | | | |
|---|---|---|---|
| 4,541,113 A | 9/1985 | Seufert et al. |
| 4,747,148 A | 5/1988 | Watanabe et al. |
| 5,001,558 A | 3/1991 | Burley et al. |
| 5,022,085 A | 6/1991 | Cok |
| 5,117,283 A | 5/1992 | Kroos et al. |
| 5,175,775 A | 12/1992 | Iwaki et al. |
| 5,222,155 A | 6/1993 | Delanoy et al. |
| 5,227,985 A | 7/1993 | DeMenthon |
| 5,343,311 A | 8/1994 | Morag et al. |
| 5,369,430 A | 11/1994 | Kitamura |
| 5,495,535 A | 2/1996 | Smilansky et al. |
| 5,500,906 A | 3/1996 | Picard et al. |

(Continued)

FOREIGN PATENT DOCUMENTS

| | | |
|---|---|---|
| CN | 103426143 B | 7/2016 |
| CN | 104063858 B | 4/2017 |
| CN | 105141858 B | 10/2018 |

OTHER PUBLICATIONS

Jie Gong et al. "Using Depth Mapping to realize Bokeh effect with a single camera Android device", EE368 Project Report. 9 pages.

(Continued)

*Primary Examiner* — Amal S Zenati
(74) *Attorney, Agent, or Firm* — PATTERSON & SHERIDAN, LLP

(57) ABSTRACT

Embodiments of the disclosure generally relate to video-conferencing systems, and more particularly, to advanced camera devices with integrated background differentiation capabilities, such as background removal, background replacement, and/or background blur capabilities, which are suitable for use in a video-conferencing application. Generally, the camera devices described herein use a combination of integrated hardware and software to differentiate between the desired portion of a video stream and the undesired portion of the video stream to-be-replaced. The background differentiation and/or background replacement methods disclosed herein are generally performed, using a camera device, before encoding the video stream for transmission of the video stream therefrom.

21 Claims, 11 Drawing Sheets

(56) References Cited

U.S. PATENT DOCUMENTS

| | | |
|---|---|---|
| 5,506,946 A | 4/1996 | Bar et al. |
| 5,517,334 A | 5/1996 | Morag et al. |
| 5,534,917 A | 7/1996 | MacDougall |
| 5,581,276 A | 12/1996 | Cipolla et al. |
| 5,631,697 A | 5/1997 | Nishimura et al. |
| 5,633,951 A | 5/1997 | Moshfeghi |
| 5,668,605 A | 9/1997 | Nachshon et al. |
| 5,682,557 A | 10/1997 | Harada et al. |
| 5,687,306 A | 11/1997 | Blank |
| 5,710,829 A | 1/1998 | Chen et al. |
| 5,740,266 A | 4/1998 | Weiss et al. |
| 5,781,659 A | 7/1998 | Melen et al. |
| 5,875,040 A | 2/1999 | Matraszek et al. |
| 5,901,245 A | 5/1999 | Warnick et al. |
| 5,953,076 A | 9/1999 | Astle et al. |
| 6,119,147 A | 9/2000 | Toomey et al. |
| 6,150,930 A | 11/2000 | Cooper |
| 6,154,574 A | 11/2000 | Paik et al. |
| 6,411,744 B1 | 6/2002 | Edwards |
| 6,618,444 B1 | 9/2003 | Haskell et al. |
| 6,636,635 B2 | 10/2003 | Matsugu |
| 6,646,687 B1 | 11/2003 | Vlahos |
| 6,661,918 B1 | 12/2003 | Gordon et al. |
| 6,664,973 B1 | 12/2003 | Iwamoto et al. |
| 6,754,367 B1 | 6/2004 | Ito et al. |
| 6,760,749 B1 | 7/2004 | Dunlap et al. |
| 6,785,014 B1 | 8/2004 | Nishikawa |
| 6,798,407 B1 | 9/2004 | Benman |
| 6,836,345 B1 | 12/2004 | Setchell |
| 6,876,768 B1 | 4/2005 | Kawade |
| 6,895,520 B1 | 5/2005 | Altmejd et al. |
| 6,937,744 B1 | 8/2005 | Toyama |
| 6,952,286 B2 | 10/2005 | Luo et al. |
| 6,993,190 B1 | 1/2006 | Nguyen |
| 7,020,335 B1 | 3/2006 | Abousleman |
| 7,050,070 B2 | 5/2006 | Ida et al. |
| 7,124,164 B1 | 10/2006 | Chemtob |
| 7,188,357 B1 | 3/2007 | Rieschl et al. |
| 7,209,163 B1 | 4/2007 | Ono |
| 7,317,830 B1 | 1/2008 | Gordon et al. |
| 7,386,799 B1 | 6/2008 | Clanton et al. |
| 7,420,490 B2 | 9/2008 | Gupta et al. |
| 7,420,590 B2 | 9/2008 | Matusik et al. |
| 7,451,474 B1 | 11/2008 | McBreen et al. |
| 7,463,296 B2 | 12/2008 | Sun et al. |
| 7,512,262 B2 | 3/2009 | Criminisi et al. |
| 7,518,051 B2 | 4/2009 | Redmann |
| 7,574,043 B2 | 8/2009 | Porikli |
| 7,599,555 B2 | 10/2009 | McGuire et al. |
| 7,602,990 B2 | 10/2009 | Matusik et al. |
| 7,623,728 B2 | 11/2009 | Avinash et al. |
| 7,631,151 B2 | 12/2009 | Prahlad et al. |
| 7,633,511 B2 | 12/2009 | Shum et al. |
| 7,634,533 B2 | 12/2009 | Rudolph et al. |
| 7,650,058 B1 | 1/2010 | Garoutte |
| 7,653,256 B2 | 1/2010 | Kanda et al. |
| 7,657,171 B2 | 2/2010 | Sundstrom |
| 7,668,371 B2 | 2/2010 | Dorai et al. |
| 7,676,081 B2 | 3/2010 | Blake et al. |
| 7,692,664 B2 | 4/2010 | Weiss et al. |
| 7,720,283 B2 | 5/2010 | Sun et al. |
| 7,742,650 B2 | 6/2010 | Xu et al. |
| 7,742,894 B2 | 6/2010 | Chen et al. |
| 7,755,016 B2 | 7/2010 | Toda et al. |
| 7,773,136 B2 | 8/2010 | Ohyama et al. |
| 7,783,075 B2 | 8/2010 | Zhang et al. |
| 7,784,079 B1 | 8/2010 | Sipple et al. |
| 7,821,552 B2 | 10/2010 | Suzuki |
| 7,831,087 B2 | 11/2010 | Harville |
| 7,965,885 B2 | 6/2011 | Iwai |
| 8,026,945 B2 | 9/2011 | Garoutte et al. |
| 8,072,439 B2 | 12/2011 | Hillis et al. |
| 8,073,196 B2 | 12/2011 | Yuan et al. |
| 8,081,346 B1 | 12/2011 | Anup et al. |
| 8,094,928 B2 | 1/2012 | Graepel et al. |
| 8,146,005 B2 | 3/2012 | Jones et al. |
| 8,170,372 B2 | 5/2012 | Kennedy et al. |
| 8,175,379 B2 | 5/2012 | Wang et al. |
| 8,175,384 B1 | 5/2012 | Wang |
| 8,204,316 B2 | 6/2012 | Panahpour Tehrani et al. |
| 8,225,208 B2 | 7/2012 | Sprang et al. |
| 8,238,605 B2 | 8/2012 | Chien et al. |
| 8,245,260 B1 | 8/2012 | Sipple et al. |
| 8,249,333 B2 | 8/2012 | Agarwal et al. |
| 8,264,544 B1 | 9/2012 | Chang et al. |
| 8,300,890 B1 | 10/2012 | Gaikwad et al. |
| 8,300,938 B2 | 10/2012 | Can et al. |
| 8,320,666 B2 | 11/2012 | Gong |
| 8,331,619 B2 | 12/2012 | Ikenoue |
| 8,331,685 B2 | 12/2012 | Pettigrew et al. |
| 8,335,379 B2 | 12/2012 | Malik |
| 8,345,082 B2 | 1/2013 | Tysso |
| 8,346,006 B1 | 1/2013 | Darbari et al. |
| 8,355,379 B2 | 1/2013 | Thomas et al. |
| 8,363,908 B2 | 1/2013 | Steinberg et al. |
| 8,379,101 B2 | 2/2013 | Mathe et al. |
| 8,396,328 B2 | 3/2013 | Sandrew et al. |
| 8,406,470 B2 | 3/2013 | Jones et al. |
| 8,406,494 B2 | 3/2013 | Zhan et al. |
| 8,411,149 B2 | 4/2013 | Maison et al. |
| 8,411,948 B2 | 4/2013 | Rother et al. |
| 8,422,769 B2 | 4/2013 | Rother et al. |
| 8,437,570 B2 | 5/2013 | Criminisi et al. |
| 8,446,459 B2 | 5/2013 | Fang et al. |
| 8,472,747 B2 | 6/2013 | Sasaki et al. |
| 8,488,896 B2 | 7/2013 | Shi et al. |
| 8,503,720 B2 | 8/2013 | Shotton et al. |
| 8,533,593 B2 | 9/2013 | Grossman et al. |
| 8,533,594 B2 | 9/2013 | Grossman et al. |
| 8,533,595 B2 | 9/2013 | Grossman et al. |
| 8,565,485 B2 | 10/2013 | Craig et al. |
| 8,588,515 B2 | 11/2013 | Bang et al. |
| 8,625,897 B2 | 1/2014 | Criminisi et al. |
| 8,643,701 B2 | 2/2014 | Nguyen et al. |
| 8,649,592 B2 | 2/2014 | Nguyen et al. |
| 8,649,932 B2 | 2/2014 | Mian et al. |
| 8,655,069 B2 | 2/2014 | Rother et al. |
| 8,659,658 B2 | 2/2014 | Vassigh et al. |
| 8,666,153 B2 | 3/2014 | Hung et al. |
| 8,670,616 B2 | 3/2014 | Hamada |
| 8,681,380 B2 | 3/2014 | Kuwata et al. |
| 8,682,072 B2 | 3/2014 | Sengamedu et al. |
| 8,701,002 B2 | 4/2014 | Grossman et al. |
| 8,723,914 B2 | 5/2014 | Mackie et al. |
| 8,787,675 B2 | 7/2014 | Makino et al. |
| 8,805,065 B2 | 8/2014 | Dai |
| 8,818,028 B2 | 8/2014 | Nguyen et al. |
| 8,831,285 B2 | 9/2014 | Kang |
| 8,849,017 B2 | 9/2014 | Ito et al. |
| 8,854,412 B2 | 10/2014 | Tian et al. |
| 8,874,525 B2 | 10/2014 | Grossman et al. |
| 8,890,923 B2 | 11/2014 | Tian et al. |
| 8,890,929 B2 | 11/2014 | Paithankar et al. |
| 8,897,562 B2 | 11/2014 | Bai et al. |
| 8,913,847 B2 | 12/2014 | Tang et al. |
| 8,994,778 B2 | 3/2015 | Weiser et al. |
| 9,008,457 B2 | 4/2015 | Dikmen et al. |
| 9,053,573 B2 | 6/2015 | Lin et al. |
| 9,065,973 B2 | 6/2015 | Graham et al. |
| 9,083,850 B1 | 7/2015 | Higgs |
| 9,084,928 B2 | 7/2015 | Klang |
| 9,087,229 B2 | 7/2015 | Nguyen et al. |
| 9,088,692 B2 | 7/2015 | Carter et al. |
| 9,117,310 B2 | 8/2015 | Coene et al. |
| 9,153,066 B2 | 10/2015 | Ishii |
| 9,215,467 B2 | 12/2015 | Cheok et al. |
| 9,245,197 B2 | 1/2016 | Hikida |
| 9,269,153 B2 | 2/2016 | Gandolph et al. |
| 9,282,285 B2 | 3/2016 | Winterstein et al. |
| 9,285,951 B2 | 3/2016 | Makofsky et al. |
| 9,286,658 B2 | 3/2016 | Bhaskaran |
| 9,336,610 B2 | 5/2016 | Ohashi et al. |
| 9,560,259 B2 | 1/2017 | Tu |
| 9,619,705 B1 | 4/2017 | Nordstrom |

(56) References Cited

U.S. PATENT DOCUMENTS

| | | |
|---|---|---|
| 9,626,795 B2 | 4/2017 | Sathe |
| 9,628,722 B2 | 4/2017 | Do et al. |
| 9,659,658 B2 | 5/2017 | Kim |
| 9,773,155 B2 | 9/2017 | Shotton et al. |
| 9,773,296 B2 | 9/2017 | Hiasa |
| 9,787,938 B2 | 10/2017 | Cranfill et al. |
| 9,881,359 B2 | 1/2018 | Liu |
| 9,886,945 B1 | 2/2018 | Sieracki |
| 10,026,012 B2 | 7/2018 | Zhu et al. |
| 10,110,792 B2 | 10/2018 | Benson |
| 10,181,178 B2 | 1/2019 | Cutler et al. |
| 10,185,416 B2 | 1/2019 | Mistry et al. |
| 10,194,060 B2 | 1/2019 | Mistry et al. |
| 10,419,703 B2 | 9/2019 | Goma et al. |
| 10,423,214 B2 | 9/2019 | Mistry et al. |
| 10,477,184 B2 | 11/2019 | Surma et al. |
| 10,504,246 B2 | 12/2019 | Rossato et al. |
| 10,551,928 B2 | 2/2020 | Mistry et al. |
| 10,582,198 B2 | 3/2020 | Hannuksela et al. |
| 10,614,562 B2 | 4/2020 | Mannar et al. |
| 10,621,697 B2 | 4/2020 | Chou et al. |
| 10,671,658 B2 | 6/2020 | Case et al. |
| 10,691,332 B2 | 6/2020 | Offenberg et al. |
| 10,692,199 B2 | 6/2020 | Sun |
| 10,742,954 B2 | 8/2020 | Chan et al. |
| 10,789,725 B2 | 9/2020 | Segman |
| 10,796,070 B2 | 10/2020 | Srivastava et al. |
| 10,848,748 B2 | 11/2020 | Handa et al. |
| 10,897,614 B2 | 1/2021 | Hannuksela et al. |
| 2001/0005222 A1 | 6/2001 | Yamaguchi |
| 2001/0036317 A1 | 11/2001 | Mori |
| 2002/0015186 A1 | 2/2002 | Nagata |
| 2002/0031262 A1 | 3/2002 | Imagawa et al. |
| 2002/0031265 A1 | 3/2002 | Higaki |
| 2002/0051491 A1 | 5/2002 | Challapali et al. |
| 2002/0051571 A1 | 5/2002 | Jackway et al. |
| 2002/0080148 A1 | 6/2002 | Uchino |
| 2002/0154820 A1 | 10/2002 | Kaneko et al. |
| 2002/0158873 A1 | 10/2002 | Williamson |
| 2002/0172433 A1 | 11/2002 | Edwards |
| 2003/0002746 A1 | 1/2003 | Kusaka |
| 2003/0004645 A1 | 1/2003 | Kochi |
| 2003/0007688 A1 | 1/2003 | Ono |
| 2003/0063669 A1 | 4/2003 | Lee et al. |
| 2003/0146884 A1 | 8/2003 | Heo |
| 2003/0161007 A1 | 8/2003 | Maurer et al. |
| 2003/0202120 A1 | 10/2003 | Mack |
| 2003/0206240 A1 | 11/2003 | Hyodo et al. |
| 2003/0231787 A1 | 12/2003 | Sumi |
| 2003/0234871 A1 | 12/2003 | Squilla et al. |
| 2004/0013315 A1 | 1/2004 | Li et al. |
| 2004/0047615 A1 | 3/2004 | Itoh |
| 2004/0062422 A1 | 4/2004 | Guichard |
| 2004/0098224 A1 | 5/2004 | Takahashi |
| 2004/0133927 A1 | 7/2004 | Sternberg et al. |
| 2004/0136593 A1 | 7/2004 | Chapoulaud |
| 2004/0151393 A1 | 8/2004 | Kurauchi |
| 2004/0153671 A1 | 8/2004 | Schuyler et al. |
| 2004/0161160 A1 | 8/2004 | Recht |
| 2004/0164972 A1 | 8/2004 | Carl |
| 2004/0184675 A1 | 9/2004 | Brown |
| 2004/0197028 A1 | 10/2004 | Lin et al. |
| 2004/0228505 A1 | 11/2004 | Sugimoto |
| 2004/0239596 A1 | 12/2004 | Ono et al. |
| 2004/0249557 A1 | 12/2004 | Harrington et al. |
| 2005/0012961 A1 | 1/2005 | Holt |
| 2005/0013490 A1 | 1/2005 | Rinne et al. |
| 2005/0053132 A1 | 3/2005 | Caball et al. |
| 2005/0093984 A1 | 5/2005 | Martins et al. |
| 2005/0105824 A1 | 5/2005 | Kesal et al. |
| 2005/0190981 A1 | 9/2005 | Fan et al. |
| 2005/0207661 A1 | 9/2005 | Miyagi et al. |
| 2005/0232493 A1 | 10/2005 | Satou et al. |
| 2005/0243350 A1 | 11/2005 | Aoyama |
| 2005/0271301 A1 | 12/2005 | Solomon et al. |
| 2005/0286743 A1 | 12/2005 | Kurzweil et al. |
| 2005/0286802 A1 | 12/2005 | Clark et al. |
| 2006/0008173 A1 | 1/2006 | Matsugu et al. |
| 2006/0013483 A1 | 1/2006 | Kurzweil et al. |
| 2006/0038894 A1 | 2/2006 | Chan et al. |
| 2006/0072022 A1 | 4/2006 | Iwai |
| 2006/0078217 A1 | 4/2006 | Poon et al. |
| 2006/0104479 A1 | 5/2006 | Bonch-Osmolovskiy et al. |
| 2006/0125799 A1 | 6/2006 | Hillis et al. |
| 2006/0159185 A1 | 7/2006 | D'Antonio et al. |
| 2006/0193509 A1 | 8/2006 | Criminisi et al. |
| 2006/0215766 A1 | 9/2006 | Wang et al. |
| 2006/0238444 A1 | 10/2006 | Wang et al. |
| 2006/0238445 A1 | 10/2006 | Wang et al. |
| 2006/0259552 A1 | 11/2006 | Mock et al. |
| 2006/0288313 A1 | 12/2006 | Hillis |
| 2007/0018966 A1 | 1/2007 | Blythe et al. |
| 2007/0025722 A1 | 2/2007 | Matsugu et al. |
| 2007/0036432 A1 | 2/2007 | Xu et al. |
| 2007/0046643 A1 | 3/2007 | Hillis et al. |
| 2007/0110298 A1 | 5/2007 | Graepel et al. |
| 2007/0127823 A1 | 6/2007 | Seeber |
| 2007/0133880 A1 | 6/2007 | Sun et al. |
| 2007/0154116 A1 | 7/2007 | Shieh |
| 2007/0165112 A1 | 7/2007 | Shinmei et al. |
| 2007/0223819 A1 | 9/2007 | Yamamoto |
| 2007/0263903 A1 | 11/2007 | St. Hilaire et al. |
| 2007/0269135 A1 | 11/2007 | Ono |
| 2008/0002961 A1 | 1/2008 | Sundstrom |
| 2008/0037869 A1 | 2/2008 | Zhou |
| 2008/0109724 A1 | 5/2008 | Gallmeier et al. |
| 2008/0123960 A1 | 5/2008 | Kim et al. |
| 2008/0181507 A1 | 7/2008 | Gope et al. |
| 2008/0240507 A1 | 10/2008 | Niwa et al. |
| 2008/0246777 A1* | 10/2008 | Swanson ............... H04N 5/272 348/E5.029 |
| 2008/0266380 A1 | 10/2008 | Gorzynski et al. |
| 2008/0273751 A1 | 11/2008 | Yuan et al. |
| 2008/0310742 A1 | 12/2008 | Kostrzewski et al. |
| 2008/0317295 A1 | 12/2008 | Koutaki |
| 2009/0003687 A1 | 1/2009 | Agarwal et al. |
| 2009/0034866 A1 | 2/2009 | Park et al. |
| 2009/0044113 A1 | 2/2009 | Jones et al. |
| 2009/0109280 A1 | 4/2009 | Gotsman et al. |
| 2009/0138805 A1 | 5/2009 | Hildreth |
| 2009/0180002 A1 | 7/2009 | Suekane |
| 2009/0199111 A1 | 8/2009 | Emori et al. |
| 2009/0219302 A1 | 9/2009 | Li et al. |
| 2009/0244309 A1 | 10/2009 | Maison et al. |
| 2009/0245571 A1 | 10/2009 | Chien et al. |
| 2009/0249863 A1 | 10/2009 | Kim et al. |
| 2009/0279779 A1 | 11/2009 | Dunton et al. |
| 2009/0284627 A1 | 11/2009 | Bando |
| 2009/0300553 A1 | 12/2009 | Pettigrew et al. |
| 2010/0014752 A1 | 1/2010 | Ishigami et al. |
| 2010/0027961 A1 | 2/2010 | Gentile et al. |
| 2010/0046830 A1 | 2/2010 | Wang |
| 2010/0053212 A1 | 3/2010 | Kang |
| 2010/0110183 A1 | 5/2010 | Bobbitt et al. |
| 2010/0114671 A1 | 5/2010 | Bobbitt et al. |
| 2010/0114746 A1 | 5/2010 | Bobbitt et al. |
| 2010/0118116 A1 | 5/2010 | Tomasz |
| 2010/0118125 A1 | 5/2010 | Park |
| 2010/0128927 A1 | 5/2010 | Ikenoue |
| 2010/0134624 A1 | 6/2010 | Bobbitt et al. |
| 2010/0134625 A1 | 6/2010 | Bobbitt et al. |
| 2010/0142832 A1 | 6/2010 | Nafarieh et al. |
| 2010/0165081 A1 | 7/2010 | Jung et al. |
| 2010/0195898 A1 | 8/2010 | Bang et al. |
| 2010/0283837 A1 | 11/2010 | Oohchida et al. |
| 2010/0296572 A1 | 11/2010 | Ramaswamy et al. |
| 2010/0302376 A1 | 12/2010 | Boulanger et al. |
| 2011/0054870 A1 | 3/2011 | Dariush et al. |
| 2011/0090246 A1 | 4/2011 | Matsunaga |
| 2011/0169921 A1 | 7/2011 | Lee et al. |
| 2011/0193939 A1 | 8/2011 | Vassigh et al. |
| 2011/0242277 A1 | 10/2011 | Do et al. |
| 2011/0249863 A1 | 10/2011 | Ohashi et al. |
| 2011/0249883 A1 | 10/2011 | Can et al. |

(56) References Cited

U.S. PATENT DOCUMENTS

| | | | |
|---|---|---|---|
| 2012/0093360 A1 | 4/2012 | Subramanian et al. |
| 2012/0133746 A1 | 5/2012 | Bigioi et al. |
| 2012/0201470 A1 | 8/2012 | Pekar et al. |
| 2012/0236937 A1 | 9/2012 | Kameyama |
| 2012/0250993 A1 | 10/2012 | Iso et al. |
| 2012/0275718 A1 | 11/2012 | Takamori et al. |
| 2012/0294510 A1 | 11/2012 | Zhang et al. |
| 2012/0309532 A1 | 12/2012 | Ambrus et al. |
| 2012/0314077 A1 | 12/2012 | Clavenna, II et al. |
| 2012/0321173 A1 | 12/2012 | Mitarai et al. |
| 2013/0003128 A1 | 1/2013 | Watanabe |
| 2013/0016097 A1 | 1/2013 | Coene et al. |
| 2013/0110565 A1 | 5/2013 | Means, Jr. et al. |
| 2013/0129205 A1 | 5/2013 | Wang et al. |
| 2013/0142452 A1 | 6/2013 | Shionozaki et al. |
| 2013/0243313 A1 | 9/2013 | Civit et al. |
| 2014/0003719 A1 | 1/2014 | Bai et al. |
| 2014/0029788 A1 | 1/2014 | Kang |
| 2014/0112530 A1 | 4/2014 | Yadani et al. |
| 2014/0112547 A1 | 4/2014 | Peeper et al. |
| 2014/0119642 A1 | 5/2014 | Lee et al. |
| 2014/0153784 A1 | 6/2014 | Gandolph et al. |
| 2014/0153833 A1 | 6/2014 | Miyakoshi et al. |
| 2014/0229850 A1 | 8/2014 | Makofsky et al. |
| 2014/0300630 A1 | 10/2014 | Flider et al. |
| 2014/0300702 A1 | 10/2014 | Saydkhuzhin et al. |
| 2014/0307056 A1 | 10/2014 | Collet Romea et al. |
| 2014/0354759 A1 | 12/2014 | Cranfill et al. |
| 2015/0040066 A1 | 2/2015 | Baron et al. |
| 2015/0117775 A1 | 4/2015 | Abe et al. |
| 2015/0243041 A1 | 8/2015 | Panetta et al. |
| 2015/0244946 A1 | 8/2015 | Agaian et al. |
| 2015/0249829 A1 | 9/2015 | Koat et al. |
| 2015/0348458 A1 | 12/2015 | Tian et al. |
| 2016/0173789 A1 | 6/2016 | Xu et al. |
| 2016/0189355 A1 | 6/2016 | Basche et al. |
| 2017/0223234 A1 | 8/2017 | Do et al. |
| 2017/0301067 A1* | 10/2017 | Cutler ............ G06T 7/50 |
| 2018/0332239 A1 | 11/2018 | Peterson et al. |
| 2019/0208119 A1 | 7/2019 | Ekstrand et al. |
| 2019/0318460 A1 | 10/2019 | Bouzaraa et al. |
| 2020/0258192 A1 | 8/2020 | Liu et al. |
| 2020/0322591 A1 | 10/2020 | Yano et al. |

OTHER PUBLICATIONS

Matthew Buzzi, Nvidia Adds Digital Green Screen, Gaming LatencyReduction for Streaming, Esports. Sep. 1, 2020. https://www.pcmag.com/news/nvidia-adds-digital-green-screen-gaming-latency-reduction-for-streaming.

Mark Murphy et al. "Lens Drivers Focus on Performance in High-Resolution Camera Modules" http://www.analog.com/analogdialogue. Nov. 2006.

Robert M. Haralick et al. "Survey, Image Segmentation Techniques" May 26, 1982. Computer Vision, Graphics, and Image Processing 29, 100-132.

Jingtang Liao et al. "Depth Map Design and Depth-based Effects with a Single Image" Delft University of Technology. 7 pages.

Nobuo Iizuka, "Image Sensor Communication—Current Status and Future Perspectives", IEICE Trans, Commun., vol. E.100-B, No. 6 Jun. 2017. p. 911-916.

"Visual Tracking and Segmentation Using Time-of-Flight Sensor", Conference Paper in Proceedings/ICIP . . . International Conference on Image Processing. Oct. 2010. 5 pages.

David Henderson, "Focus: Industrial strength, smartphone sensibilities", Special Lighting & Optoelectronics. www2.electronicproducts.com. May 2012.

\* cited by examiner

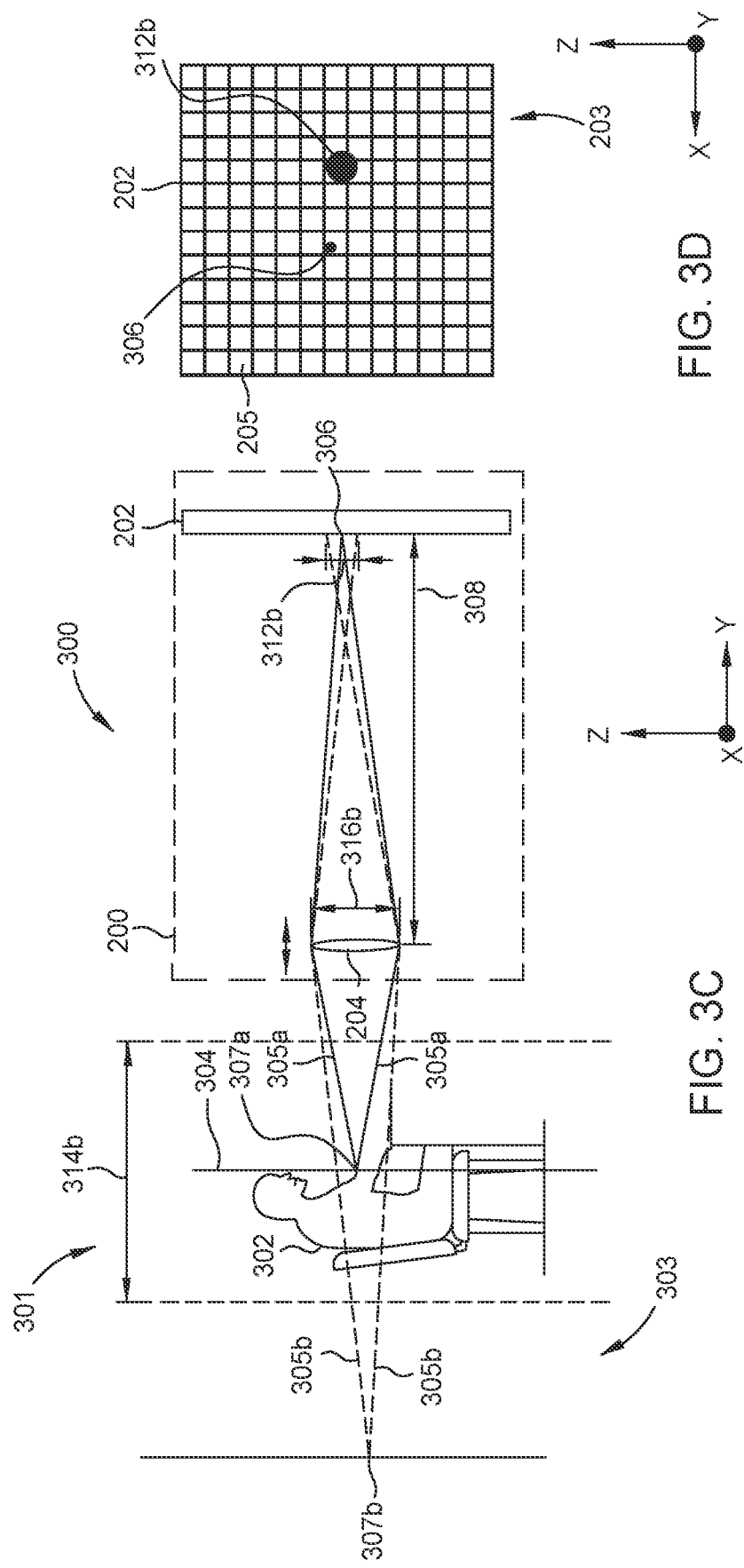

SMART WEBCAM SYSTEM

BACKGROUND

Field

Embodiments of the present disclosure generally relate to video-conferencing systems, and more particularly, to integrated camera devices with background replacement capabilities.

Description of the Related Art

Video-conferencing has become more popular in recent years due largely to the declining costs of video-conferencing equipment, the proliferation of high-speed Internet, and a global movement towards remote work situations. As users' familiarity with video-conferencing increases, so does their demand for more sophisticated video streaming features, such as background removal and/or replacement schemes for live video-conferencing applications.

Early background replacement methods were based on chroma key compositing, where two or more video streams are layered together based on different color hues. Chroma key compositing requires the use of a monochrome background screen, e.g., a green screen, and even bright lighting to avoid shadows, which might otherwise present as a darker color and not register for replacement, and to prevent undesirably high amounts of noise by providing a bright and unsaturated image. However, chroma key compositing is generally disfavored for occasional individual video-conferencing use due to the unwieldy and unattractive nature of required background screens and due to the expensive professional-level lighting requirements associated therewith.

Due to chroma key compositing's undesirability for individual use, such as with a remote work situation, users have shown increasing interest in virtual backgrounds. Virtual background schemes typically provide background removal and/or replacement performed using a software executing on a user device, e.g., a personal computer, a laptop, or a gaming console that is remote from the video camera.

Often virtual background replacement schemes rely on post-transmission processing of a video stream to identify subject matter for inclusion in the desired portion of the video stream, e.g., a conference participant located in a foreground portion and subject matter that is not to be included in the desired portion of the video stream, e.g., the undesired background portion. For example, post-transmission processing may rely on software algorithms that recognize a conference participant and separate the conference participant from the undesired background portion. Because such schemes rely on post-transmission video data processing, i.e., two-dimensional information, the software algorithm cannot determine the distance between an object and the camera device and thus is not in fact separating the foreground from the background. Instead, the software algorithm is likely identifying objects within the image and deciding on whether that object should be classified as a foreground object or a background object based on object classification. Those who have used conventional virtual background schemes may be familiar with the strange resulting phenomena where an object in a conference participant's hands, e.g., a book or a telephone, is undesirably replaced with portions of the background image.

Additionally, even with the problems described above, the cost, time, and technical complexity of implementing conventional virtual background replacement have proven prohibitive to potential users who may otherwise desire the privacy and other benefits afforded thereby. For example, users of such virtual background schemes frequently complain of the increased computing power requirements, which may be more than is available for a typical individual remote office setup. Further, such virtual background replacement software may be incompatible for use with readily available video-conferencing software applications and may introduce an undesirable lag to a live video stream, the user's separation from the background, or both.

Accordingly, there is a need in the art for integrated video camera devices and related methods that solve the problems described above.

SUMMARY

Embodiments herein generally relate to video-conferencing systems, and more particularly, to advanced camera devices with integrated background differentiation capabilities, such as background removal, background replacement, and/or background blur capabilities, suitable for use in a video-conferencing application.

In one embodiment, a camera device for use with a video streaming system is provided. The camera device includes an image sensor, a lens, an aperture assembly operable to change an effective aperture of the lens, and a controller. The controller includes a non-transitory computer-readable medium that includes instructions configured to cause the camera device to perform a method when executed by a processor. The method includes: acquiring, from the image sensor, video data of a physical environment; separating a first portion of the video data from a second portion of the video data; encoding the first portion to generate encoded video data; and transmitting a video stream including the encoded video data to a user device.

In another embodiment, a computer-implemented method is provided. The computer-implemented method includes: (a) focusing a camera device on a subject located within a first region of a physical environment, where the subject has a boundary that defines a portion an edge of the first portion; (b) defocusing, using the camera device, a second region of the physical environment to define a second portion of an image, where the first region is located between the second region and the camera device; (c) acquiring video data of the physical environment including the first portion and the second portion; (d) separating the first portion of the video data from the second portion of the video data; (e) encoding the separated first portion of the video data to generate encoded video data; and (f) transmitting a video stream including the encoded video data to a user device. The camera device includes a controller having a non-transitory computer-readable medium that includes instructions which, when executed by a processor, are configured to cause the camera device to perform (a)-(f).

In another embodiment, a video-conferencing method is provided. The video-conferencing method includes using a camera device to: acquire video data of a physical environment; separate a first portion of the video data from a second portion of the video data based on a difference in focus therebetween; encode the first portion to generate encoded video data; and transmit a video stream including the encoded video data to a user device. Here, acquiring video data includes focusing the camera device on a subject located in a first region of the physical environment to define the first portion of the video data and defocusing a second region to define the second portion of the video data.

In some embodiments, one or more of the camera device, computer-implemented method, and video conferencing method further includes: analyzing the first portion of the video data using one or more composition rules to determine a desired composition of a to-be-transmitted video stream; and before encoding the first portion of the video stream, altering the first portion based on a difference between an actual composition of the to-be-transmitted video stream and the desired composition. In some embodiments, one or more of the camera device, computer-implemented method, and video conferencing method further includes: generating metadata of one or more aspects of a composition of the acquired video data; and transmitting the metadata to the user device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. However, it is to be noted that the appended drawings illustrate only typical embodiments of this disclosure and are therefore not to be considered limiting of its scope, for the disclosure may admit to other equally effective embodiments.

FIG. 3C is a schematic diagram illustrating features of the camera device described in FIG. 2, according to one embodiment.

FIG. 3D is a plan view of the sensing region of the image sensor of the camera device illustrated in FIG. 3A, according to one embodiment.

To facilitate understanding, identical reference numerals have been used to designate identical elements that are common to the figures where possible. It is contemplated that elements and features of one embodiment may be beneficially incorporated in other embodiments without further recitation.

DETAILED DESCRIPTION

Figure 1:
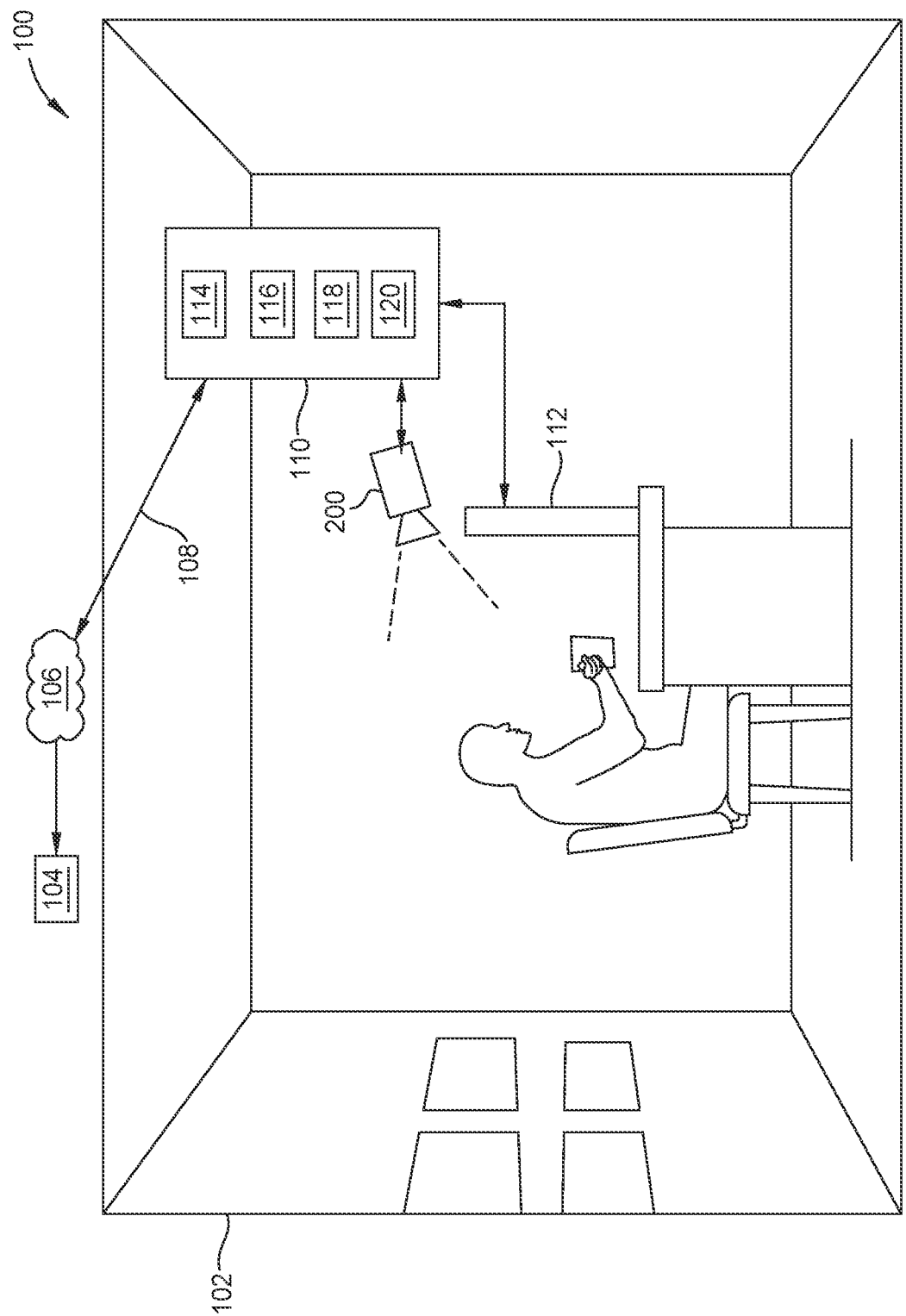
FIG. 1 is a schematic representation of an exemplary video-conferencing system, according to one embodiment.

Embodiments herein generally relate to video-conferencing systems, and more particularly, to advanced camera devices with integrated background differentiation capabilities, such as background removal, background replacement, and/or background blur capabilities, which are suitable for use in a video-conferencing application.

Generally, the camera devices described herein use a combination of integrated hardware and software to differentiate between the desired portion of a video stream (e.g., a video-conferencing participant) and the undesired portion of the video stream to-be-replaced (e.g., the background behind the conference participant). In some embodiments, the integrated hardware is used to defocus and/or blur the undesired background while focusing and/or sharpening the desired foreground, including the conference participant and objects in front of the conference participant. Concurrently defocusing the undesired background while focusing the desired foreground differentiates therebetween and simplifies background removal and/or replacement.

Typically, background removal and/or replacement methods relying on post-transmission processing of a video stream using software alone rely on algorithms to identify subject matter for inclusion in a desired portion of a video stream, e.g., a conference participant and subject matter that is not a desired portion of the video stream. Often, the desirability of the inclusion of an object in the video stream depends on the location of the subject matter within the video-conferencing environment. For example, visual clutter such as a coffee mug or book disposed on a surface behind the conference participant would likely not be desired for inclusion in the video stream, and the algorithm may be configured to replace those objects with the replacement background image. Typically, it would be undesirable to replace those same objects with the replacement background image if they were held in the hand of the conference participant or were located between the conference participant and the camera. Unfortunately, typical post-video transmission software-only background replacement schemes are unable to distinguish between the desirability of inclusion of an object based on its location. Thus, an object in a conference participant's hands or disposed between the conference participant and the camera device may be undesirably removed from the video stream, causing a strange discontinuity therein.

Beneficially, the combination of integrated hardware and software methods provided herein enables differentiation between subject matter in the desired foreground and subject matter in the undesired background based on location relative to the camera device. Using the location of subject matter relative to the camera device enables a true separation of the physical foreground and background portions of a video-conferencing environment based on physical distance from the camera device rather than software-only determinations of whether the subject matter should be classified as foreground subject matter or background subject matter, e.g., by software-only image segmentation algorithms. Thus, for example, an object in the conference participant's hands or between the conference participant and the camera device is included in the to-be-transmitted portion of the videostream without the need for identification or classification thereof. As a result, a video stream of the separated actual foreground portion combined with a replacement background will have a more realistic and natural feel than a video stream formed from a separated virtual foreground obtained using software-based image segmentation methods alone.

Herein, the background differentiation methods and/or background replacement schemes are performed using the camera device before the video stream is transmitted to a user device having a video-conferencing application executing thereon. In some embodiments, the background differentiation and/or background replacement methods are performed using the camera device before encoding the video stream for transmission of the video stream therefrom. In some embodiments, the background differentiation methods and/or background replacement schemes sufficiently reduce the size of the resulting video data stream that the resulting video stream may be transmitted to the user device as raw data, i.e., without encoding and/or compression. For example, the background differentiation and/or background replacement schemes may provide a replacement background with a single-pixel color, such as black pixels, thus reducing the resulting raw data to a size that may be transmitted to the user device without encoding and/or compression. By providing for pre-encoding and thus pre-compression background differentiation, or for raw data of substantially reduced size, the advanced camera devices herein desirably avoid accumulated latencies that would otherwise propagate with a background replacement software executing on an operating system of a user device separate from, but communicatively coupled to, the camera device.

The pre-encoding and pre-compression background differentiation techniques disclosed herein will also reduce the amount of information that needs to be transmitted from the camera device due to the removal of the unnecessary background information prior to transmission from the camera device. The techniques disclosed herein will reduce the hardware and data transmission protocol (e.g., USB 2.0 versus USB 3.0) requirements needed to transmit the relevant video-conferencing information from the camera device to one or more external electronic devices. Therefore, the removal of undesired information relating to the background from the video stream at the camera device substantially reduces the bandwidth otherwise required for transmission of an unmodified video stream.

In some embodiments, the increased bandwidth availability provided by the advanced camera device may be used to provide the transmission of portions of higher resolution images, e.g., 4 k or more, between the advanced camera device and the user device while using less complex and lower cost data transmission hardware and transmission techniques. The background differentiation methods may be used with but are generally invisible to video-conferencing software applications, such as Microsoft® Skype®, Apple® FaceTime®, and applications available from Zoom® Video Communications, Inc, which advantageously facilitates seamless integration therewith.

In some embodiments, the information provided by the background differentiation methods may be used to facilitate further processing using a video-conferencing software application. For example, in some embodiments, information received from the camera device may be used by the video-conferencing software application to apply a higher compression to areas of the video stream that are of relativity low interest, e.g., identified background portions, than the compression applied to areas of higher interest, e.g., a conference participant. Thus, the information received from the camera device may be used to provide a high quality sharper image of a conference participant while simultaneously reducing bandwidth requirements for the to-be-transmitted video stream.

FIG. 1 is a schematic representation of a video-conferencing system 100, according to one embodiment, which may be used to implement the methods set forth herein. Here, the video-conferencing system 100 includes a first video-conferencing endpoint 102 of one or more remote video-conferencing endpoints, such as the second video-conferencing endpoint 104, and a network 106 that facilitates communication therebetween. The network 106 generally represents any data communications network suitable for the transmission of video and audio data (e.g., the Internet). A communication link 108 is used to support the transmission of video conference feeds that include audio and video streams between the first video-conferencing endpoint 102, the network 106 and/or the second video-conferencing endpoint 104. The communication link 108 may be formed on a network that is connected to a Local Area Network (LAN) present in each video conference location and/or across multiple video conference locations on a Wide Area Network (WAN).

In one configuration, the communication link 108 utilizes a wired or wireless communication technique to transmit data between the video-conferencing locations. Wireless communication techniques can include but are not limited to a cellular phone network, WiFi network, satellite communication network, or other useful wireless communication techniques. Wired communication techniques may include but are not limited to fiber, cable, or DSL type data transmission methods/technologies. In general, the second video-conferencing endpoint 104 will include one or more systems that are able to receive, process and/or display the information transmitted from the first video-conferencing endpoint 102 via the communication link 108 and may include, but is not limited to, a laptop, personal computer, tablet, smartphone, or other similar electronic devices.

The first video-conferencing endpoint 102 features a user device 110, a display 112, an advanced camera device 200, and a communication link 113 communicatively coupling the camera device 200 to the user device 110. The user device 110 represents any computing device capable of transmitting a video stream to a remote video-conferencing device (e.g., the second video-conferencing endpoint 104) via the communication link 108 that is in communication with the network 106. Examples of computing devices suitable for use as the user device 110 include, without limitation, laptops, personal computers, tablets, and smartphones. The user device 110 includes a programmable central processing unit (e.g., CPU 114), which is operable with a memory 116 (e.g., non-volatile memory) and support circuits 118. In some embodiments, one or more of the CPU 114, memory 116, and support circuits 118 are integrally formed on a single substrate to form a system on a chip (SOC) device. Here, the CPU 114 is used to execute a video-conferencing software application 120 stored in the memory 116, which is capable of transmitting data (e.g., video data) received from the camera device 200 to the second video-conferencing endpoint 104 via the communication link 108, and receiving video data from the second video-conferencing endpoint 104, via the communication link 108. Examples of video-conferencing software application 120 include, without limitation, Microsoft® Skype®, Apple® FaceTime®, and applications available from Zoom® Video Communications, Inc. More generally, however, any video-conferencing software application capable of receiving video data and transmitting the video data to a remote site can be used, consistent with the functionality described herein.

In some embodiments, the user device 110 may be used to display video data captured at and received from the second video-conferencing endpoint 104, on the display 112 (e.g., LED television, OLED television, plasma display). In some embodiments, the user device 110 includes a native display, e.g., for a laptop or tablet. The communication link 113 may be wired or wireless. In some embodiments, the communication link 113 is a USB connector selected from the industry standards of USB 2.0, 3.0, and 3.1 that have one or a combination of type A, B, C, mini-A, mini-B, micro-A, and micro-B plugs.

Figure 2:
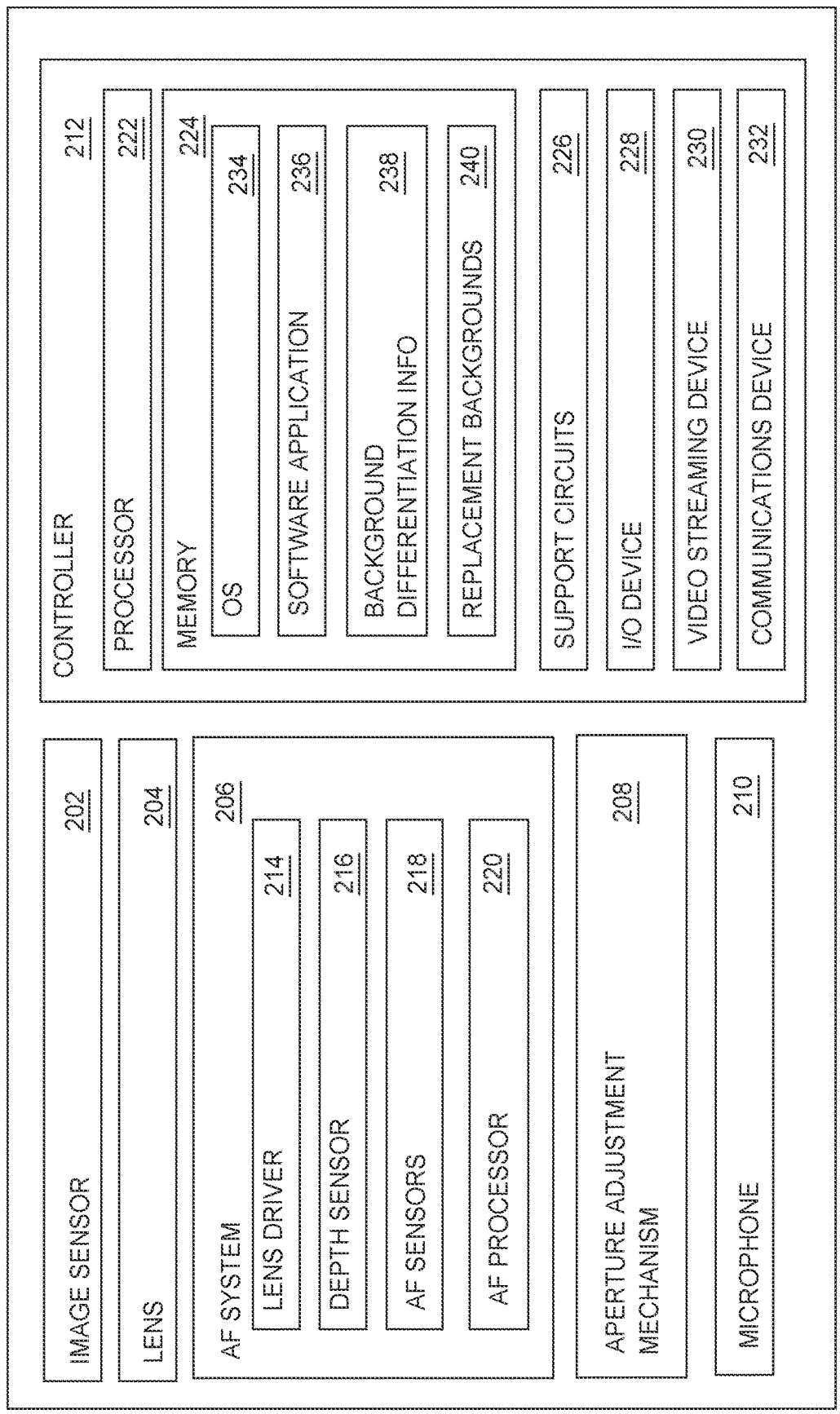
FIG. 2 is a schematic representation of various components of a camera device that may be used with the conferencing system of FIG. 1, according to one embodiment.

FIG. 2 is a schematic representation of the camera device 200 shown in FIG. 1, according to one embodiment. Here, the camera device 200 includes an image sensor 202, a lens 204, an autofocus system 206, an aperture adjustment mechanism 208, a microphone 210, and a controller 212.

Typically, the image sensor 202 is a digital device, such as one of a charge-coupled device (CCD) image sensor, where each pixel of resolution has a corresponding metal oxide capacitor, or a complementary metal-oxide semiconductor (CMOS) image sensor, where each pixel of resolution has a corresponding photodiode and CMOS transistor switch. The image sensor 202 may be selected to provide any desired resolution, where the desired resolution is expressed as a horizontal resolution of about 720p, 1080p, 1440p, 3840p (4K), 7680p (8K), or more for a display device having an aspect ratio of about 4:3, 16:9, or 21:9. For example, an image sensor 202 configured to provide a 3840p resolution for a display device having a 16:9 aspect ratio is capable of providing about 8,294,400 pixels per frame.

Here, one or both of the image sensor 202 and the lens 204 are movable with respect to one another to adjust the focal length 308 (FIG. 3A) of the camera device 200 using an autofocus (AF) system 206. Here, the autofocus (AF) system 206 includes a lens driver 214 and one or a combination of a depth sensor 216, one or more AF sensors 218, and an AF processor 220. The AF system 206 may be configured as an active AF system, a passive AF system, or a hybrid thereof.

Active AF systems typically work by measuring a distance to the desired subject, by use of the depth sensor 216, and, based on the measured distance, adjusting a focal length of the camera device 200 by moving one or both of the lens 204 and the image sensor 202 with respect to one another. Here, the lens 204 is movable with respect to the image sensor 202 by use of the lens driver 214, which may be a voice-coil motor (VCM) actuator, a piezoelectric actuator, a stepper motor, or a combination thereof.

The depth sensor 216 may be any sensor(s), sensor array(s), or other device(s) suitable for determining depth information related to surfaces found within the physical environment 300. The depth information includes distances from surfaces found within the physical environment 300 to the camera device 200. In some embodiments, the depth sensor 216 comprises a time of flight (TOF) range finding system which employs TOF techniques to determine the distance between the camera device 200 and the surfaces in the physical environment 300. Typical TOF techniques measure the round trip time of light emitted from a pulsed light source, e.g., a laser or an LED, to surfaces in the scene and reflected back to a sensor or an array of sensors of the depth sensor 216. Distance information is then calculated using the round trip time and the speed of light.

In some embodiments, the TOF range finding system is a TOF range imaging system that may be used to generate a depth map having a plurality of pixels, each pixel corresponding to a distance from a point surface in the desired scene to the camera device. In some embodiments, a depth map generated by the TOF range imaging system has a resolution of 640×480 pixels or more, i.e., VGA resolution or more. For example, in some embodiments, the TOF range imaging system includes one or more logical expressions, defined by software instructions stored in memory, which allow the TOF range imaging system to determine distances to surfaces in a desired scene for each corresponding pixel and to generate a depth map therefrom.

Figures 3A, 3B:
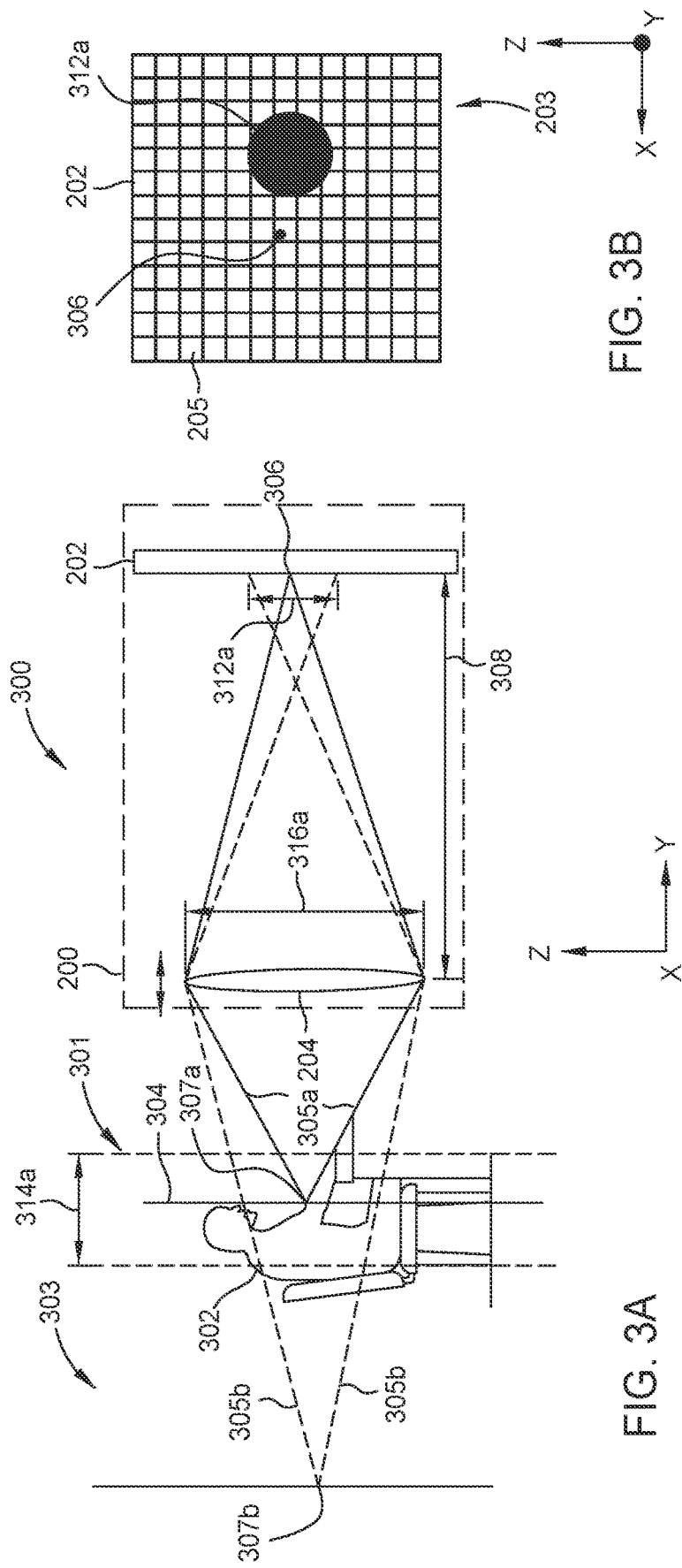
FIG. 3A is a schematic diagram illustrating features of the camera device described in FIG. 2, according to one embodiment.
FIG. 3B is a plan view of the sensing region of the image sensor of the camera device illustrated in FIG. 3A, according to one embodiment.

In other embodiments, the depth sensor 216 may be configured to determine relative distances of surfaces in a desired scene to the camera device 200 using two or more stereo images taken using a corresponding number lens/image sensor combinations. For example, in some embodiments, the lens 204 and image sensor 202 may comprise a first lens and a first image sensor, and the depth sensor 216 may include a second lens and a second image sensor (not shown). Each lens and sensor combination are disposed in a fixed relationship to one another, i.e., a fixed distance apart so that each has a slightly different view of a physical environment 300 (FIGS. 3A, 3C). Thus, the same features within images generated by each lens and sensor combination will have different pixel coordinates (within the image) from one another. A relatively large distance between pixel coordinates for an object indicates that the object is closer to the camera device than would a relatively small distance, which would indicate that the object is further away. Images generated by each lens and sensor combination are overlaid, and the distance between pixels in each image corresponding to the same objects within a scene are used to determine a relative distance of the objects to the camera device 200.

Generally, passive AF systems rely on an analysis of data acquired by one or more AF sensors 218, e.g., a phase detection sensor or contrast-detection sensors, each corresponding to an autofocus point. Information gathered by a phase detection sensor includes the relationship of a plane of focus 304 to the object, i.e., in front of or behind the object), and the change in focal length 308 required to cause the convergence thereof. Phase-detection AF is a relatively fast (compared to passive AF) process where the phase difference between one or more AF pixels is minimized by adjusting the lens focus, e.g., by use of a feedback loop. Passive AF using a contrast detection sensor is a relatively slow iterative process (when compared to phase-detection AF) where the AF processor 220, using the lens driver 214, (a) makes a change in focal length, (b) determines, using the one or more AF sensors 218, whether and by how much the focus has changed, (c) based on the result from (b), changes to a new focal length, and (d) repeats (b) and (c) until desired focus has been achieved.

The lens 204 may be selected for a desired blur or "bokeh" effect and/or to facilitate the background differentiation methods described herein. For example, in some embodiments, the lens 204 may be of a type commonly used in portrait photography where an aperture of the lens 204 is selected to provide a relatively shallow depth of field so that the subject stands out against a blurred background. In embodiments herein, the aperture of the lens 204 may be finely controlled, using the aperture adjustment mechanism 208 to allow for changes to the depth of field and to facilitate the background differentiation methods described below.

The aperture adjustment mechanism 208 is used to change the aperture of the lens 204 by restricting the size of the opening having light passing therethrough, e.g., by use of a flexible diaphragm. As described further in FIGS. 3A-3D below, the AF system 206 may be used in combination with the aperture adjustment mechanism 208 to respectively focus on the desired portions of a scene and defocus or blur undesired portions of a scene.

The controller 212 is an electronic device that includes a processor 222, memory 224, support circuits 226, input/output devices 228, a video streaming device 230, and a communications device 232. The processor 222 may be any one or combination of a programmable central processing unit (CPU), a graphics processing unit (GPU), a digital signal processor (DSP), a programmable gate array (FPGA), an application-specific integrated circuit (ASIC), or other hardware implementation(s) suitable for performing the methods set forth herein, or portions thereof.

The memory 224, coupled to the processor 222, is non-transitory and represents any non-volatile type of memory of a size suitable for storing one or a combination of an operating system 234, one or more software applications, e.g., software application 236, background differentiation information 238, such as depth maps or metadata, generated using the methods set forth herein, and one or more replacement backgrounds 240.

Examples of suitable memory that may be used as the memory 224 include readily available memory devices, such as random access memory (RAM), flash memory, a hard disk, or a combination of different hardware devices configured to store data. In some embodiments, the memory 224 includes memory devices external to the controller 212 and in communication therewith. In some embodiments, the software application 236 stored in memory 224 include instructions which, when executed by the processor 222, are configured to perform one or more of the methods described herein.

The video streaming device 230 is coupled to the processor 222 and is generally used to encode video data acquired from the image sensor 202 in a desired encoding format and at a desired bitrate. Generally, bitrate describes how much video data a video stream contains where higher resolution, higher frame rates, and lower compression requires an increased bitrate. Typically, the acquired video data is encoded into a desired encoding format, at a desired resolution, and at desired frame rate. The desired resolution may be about 720p, 1080p, 1440p, 3840p (4K), 7680p (8K), or more for a display device having an aspect ratio of about 4:3, 16:9, or 21:9. The desired frame rate is typically greater than about 30 frames per second (fps) and may be within a range from about 30 fps to about 60 fps or more.

Here, the communications device 232, communicatively coupled to the video streaming device 230, delivers the encoded video data to the user device 110 using a wireless connection, such as WiFi or Bluetooth®, or a wired connection, such as the communication link 113 described in FIG. 1.

In some embodiments, more than one of the processor 222, memory 224, support circuits 226, input/output devices 228, video streaming device 230, and communications device 232 are integrally formed with one another on a single substrate, e.g., to form a system on a chip (SOC) device.

In some embodiments, the user device 110 then transmits the video data to a remote video-conferencing endpoint, such as the second video-conferencing endpoint 104, using the video-conferencing software application 120. Typically, the desired encoding format, bit rates, and/or frame rates of the to-be-transmitted video data are established between the controller 212 and the video-conferencing software application 120 of the user device 110 before full communication begins therebetween, e.g., by a handshake protocol. In other embodiments, video data is transmitted to a remote video-conferencing endpoint(s) using conventional communication devices and protocols. For example, the video data may be transmitted to a remote video-conferencing endpoint using a network interface card, Ethernet card, modem, wireless network hardware, and/or other conventional computing device communication hardware.

Herein, the software application 236 includes instructions configured to control the operation of the depth sensor 216, an autofocus system 206, and the aperture adjustment mechanism 208 to perform the background differentiation methods set forth below.

FIGS. 3A and 3C are schematic diagrams illustrating features of the camera device 200 in relation to a physical environment 300, which may be used to perform the methods set forth herein. FIGS. 3B and 3D are plan views of the surface of the image sensor 202 shown in FIGS. 3A and 3C, respectively. As shown in FIGS. 3B and 3D, the image sensor 202 includes a sensor array 203 comprising a plurality of light-sensitive pixels 205.

Here, the physical environment 300 includes a first region 301 proximate to the camera device 200 and a second region 303 distal from the camera device 200. The first region 301 is a foreground portion and includes a conference participant 302. The second region 303 is a background portion and includes subject matter that the conference participant 302 desires to keep private and excluded from a to-be-transmitted video stream, e.g., other persons, objects, surfaces, and/or portions of a structure. Here, a focal length 308 of the camera device 200 has been adjusted, by use of the AF system 206, to bring the conference participant 302 into focus by moving a plane of focus 304 proximate thereto. The plane of focus 304 is a two-dimensional plane representing a theoretical plane of sharpest focus for a given focal length 308. Generally, light rays 305a reflected from point surfaces 307a at the plane of focus 304 are within the sharpest focus as they converge on the image sensor 202 as individual points of light 306. Generally, light rays reflected from point surfaces at the plane of focus 304 are within the sharpest focus as they converge on the image sensor 202 as individual points.

Light rays reflected from point surfaces on either side of the plane of focus 304 have a point of convergence that is before or after the surface of the image sensor 202 and will therefore form an image on the surface of the image sensor 202 that is a circle of light versus an individual point. This circle of light is typically referred to as a circle of confusion, a blur spot, or, herein, a blur circle 312a,b. The size of blur circle 312a,b is determined by properties of the lens 204, the size of the lens aperture 316a,b, and the distance of a point surface from the plane of focus.

For example, for an effective lens aperture 316a,b, the greater the distance of a point surface from the plane of focus 304, the larger the diameter of the blur circle 312a,b. As described below, for a fixed distance between a point surface and the plane of focus 304, the larger the lens aperture, the smaller the diameter of the blur circle 312a,b. Thus, in embodiments herein, the lens aperture 316a,b is adjustable to control the size of the blur circle 312a,b and thus control the camera device's depth of field.

In FIG. 3A, a diameter of a lens aperture 316a is larger than that of the lens aperture 316b shown in FIG. 3C, causing the depth of field 314a of FIG. 3A to be narrower than the depth of field 314b of FIG. 3C. Depth of field is the distance between the closest and farthest portions in the video-conferencing environment, relative to the camera device 200, where the subjects or objects disposed therein are in an acceptably sharp focus.

In FIGS. 3A-3D, light rays 305a reflected from a point surface 307a at the plane of focus 304 are collected via the lens 204 and redirected to converge onto the image sensor 202 as an individual point of light 306. The individual point of light 306 is captured by the image sensor 202 as an individual pixel, or groups of pixels, with limited overlap between adjacent pixels or groups of pixels, thus increasing the sharpness of the image. Light rays 305b reflected from a point surface 307b that is not within the depth of field 314a,b, are redirected by the lens 204 to converge before the image sensor 202, resulting in the formation of larger blur circles 312a,b on the sensor array 203 (when compared to the individual point of light 306).

As discussed above, the size of the blur circle 312a,b is determined by the distance of the surface 308b from the plane of focus 304 and the size of a lens aperture 316a,b. Reducing the size of the lens aperture 316b, as shown in FIG. 3C, widens the depth of field 314b of the camera device 200 as the relatively shallower angle of the light rays 305b passed through the lens 204 produces a relatively smaller diameter blur circle 312b, resulting in a more focused image. Conversely, increasing the size of the lens aperture 316a narrows the depth of field 314a of the camera device 200a as the increased angle of light rays 305b passed through the lens 204 produces a relatively larger diameter blur circle 312a and results in a less focused (more blurry) image.

Figure 3F:
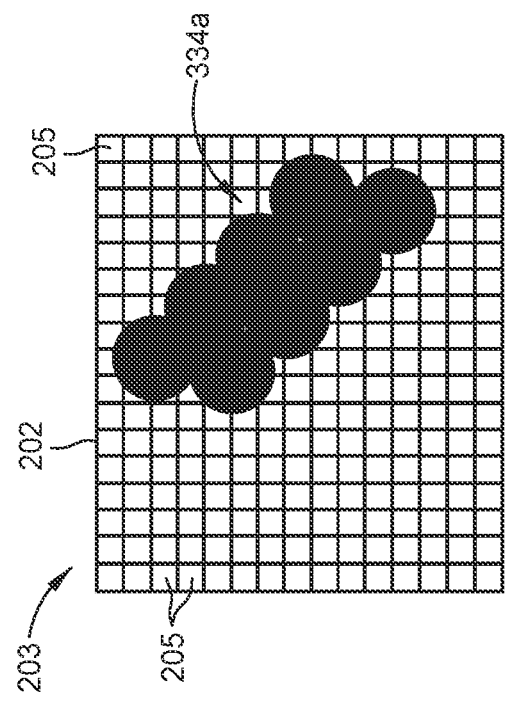
FIGS. 3E-3G are plan views of the sensing region of the image sensor of a camera device.
Figure 3G:
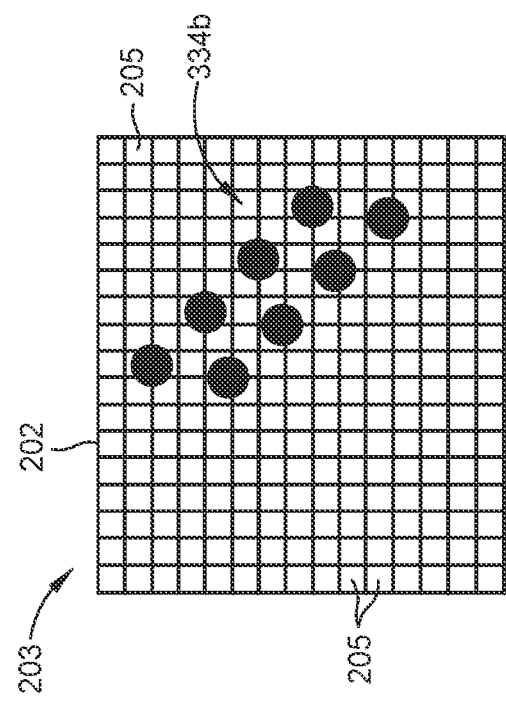
Figure 3E:
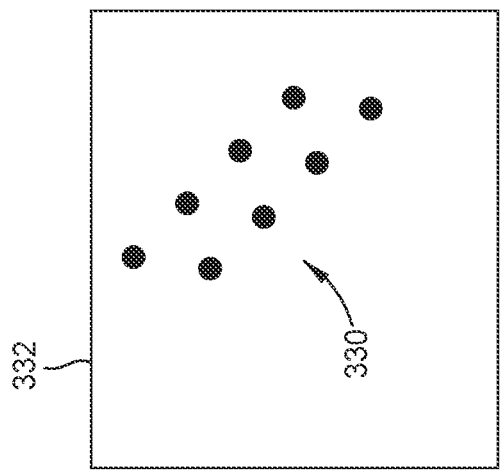

The effect of the size of the blur circle is further illustrated in FIGS. 3E-3G. FIG. 3E illustrates a plurality of point surfaces 330 within a field-of-view 332 of a camera device 200 where the point surfaces 330 are behind the focal plane (further away) relative to the camera device 200. The position of the camera device 200 relative to the point surfaces 330 and the focal length of the camera device 200 is the same between FIGS. 3F and 3G illustrate respective pluralities of blur circles 334a,b, formed using different lens apertures, where each of the pluralities of blur circles 334a,b are formed of light rays reflected from the plurality of point surfaces 330 and redirected by the lens 204 onto the sensor array 203. FIG. 3F illustrates a plurality of blur circles 330a projected onto the sensor array 203 using a relatively large lens aperture, such as the lens aperture 316b of FIG. 3A. FIG. 3G illustrates a plurality of blur circles 330b projected onto the sensor array 203 using a relatively small lens aperture, such as the lens aperture 316b of FIG. 3C.

As shown, the larger lens aperture 316a used in FIG. 3F results in larger blur circles 334a, which overlap with one another on the sensor array 203 and on the individual light-sensitive pixels 205 thereof, thus causing the resulting image to appear blurry and defocused. The smaller lens aperture 316b used in FIG. 3G results in relatively smaller blur circles 334b, which are still relatively distinct from one another so that the resulting image will appear sharper and more focused than that of FIG. 3F.

Note that because the focal length of the camera device 200 does not change between FIGS. 3F and 3G, objects on the plane of focus 304 or proximate thereto will remain in focus. In other words, as the aperture 316a,b is adjusted to focus or defocus objects behind the plane of focus 304 (FIGS. 3A-3D), the individual points of light 306 (FIGS. 3A-3D) corresponding to points surfaces 307a (FIGS. 3A-3D) at the plane of focus 304 will remain the same size. The subject matter, e.g., the conference participant 302, located at or proximate to the plane of focus 304 in the first portion 301, remains in focus while the aperture 316a,b is adjusted to defocus or blur subject matter in the second portion. The difference in sharpness of edges of objects in the first region 301 and the blurred edges of the defocused objects in the second region 303 enables the background differentiation methods disclosed herein.

To facilitate the methods herein, the camera device 200 is configured to adjust the depth of field 314a,b so that the conference participant 302 is included in the depth of field 314a,b and undesired background objects and surfaces are not, thus differentiating the first region 301 of the physical environment 300 from the second region 303. Using the aperture of the camera device 200 to differentiate the background portion from the foreground portion beneficially reduces the computing power that would otherwise be required for background removal and/or replacement methods, such as the method set forth in FIG. 4.

Figure 4:
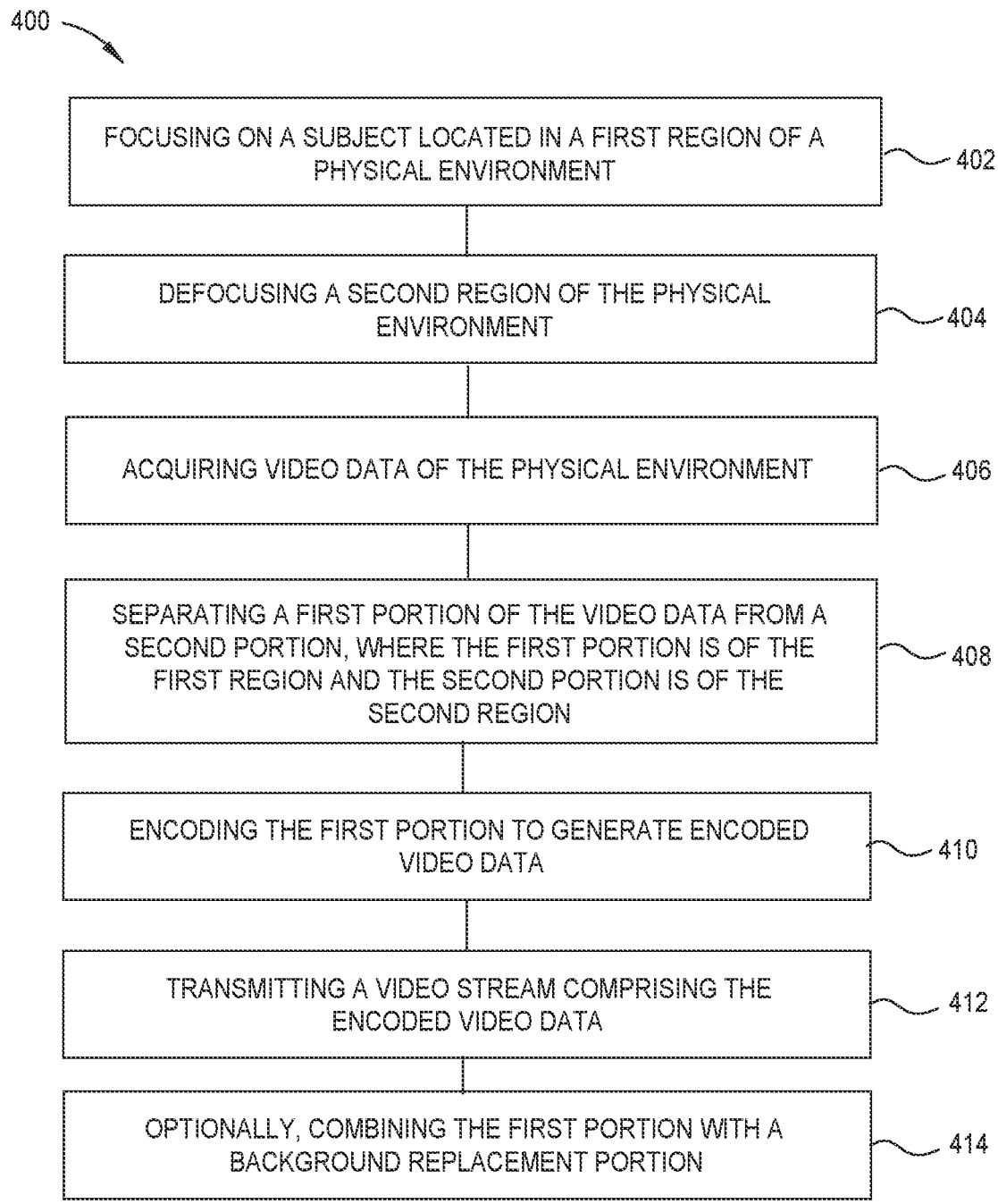
FIG. 4 is a diagram illustrating a video-conferencing method that may be performed with the camera device of FIG. 2, according to one embodiment.

FIG. 4 is a diagram illustrating a video-conferencing method 400, according to one embodiment, which may be performed using the camera device 200. Aspects of the method 400 are illustrated in FIGS. 5A-5D.

At activity 402 the method 400 include focusing the camera device 200 on a subject, e.g., a conference participant 302, located in a first region 301 of a physical environment 300. Here, focusing the camera device 200 on the subject includes moving one or both of the lens 204 and the image sensor 202 with respect to one another to adjust a focal length 308 therebetween.

In some embodiments, focusing the camera device 200 on the subject includes determining the location of the subject, e.g., the conference participant 302, relative to the camera device 200 and/or bringing the subject into focus by using the autofocus system 206. The autofocus system 206 may be configured for active AF using the depth sensor 216, passive AF using the AF sensors 218, or a combination thereof. Typically, a plane of focus 304 of the camera device 200 intersects with the subject or is located proximate thereto.

In some embodiments, activity 402 of the method 400, includes using a software application 236, which is executed by use of the processor 222 on the controller 212, such as an upper-body detection software and/or facial recognition software, to identify the location of a conference participant 302 within the scene 500. In some embodiments, the software application 236 is configured to implement an image segmentation method to detect the conference participant, as described below at activity 404.

At activity 404 the method 400 includes defocusing a second region 303 of the physical environment 300. In some embodiments, defocusing the second region 303 includes adjusting an effective aperture of the lens 204 to change an actual depth of field of the camera device to the desired depth of field 314a,b. The desired depth of field is used to delineate the boundaries between the to-be-transmitted foreground portion 501 and the to-be-removed and/or replaced background portion 503. The desired depth of field 314a,b is based on the desired inclusion of subject matter in the foreground portion 501 of the scene 500, the desired exclusion of subject matter from the foreground portion 501, and a desired blur or defocus in the background portion 503 to facilitate differentiation between the foreground portion 501 and the background portion 503.

In some embodiments, determining a desired plane of focus 304 and/or a desired depth of field 314a,b includes analyzing the scene 500 to identify subject matter which is desired for inclusion in the to-be-transmitted video stream, e.g., the conference participant 302, and subject matter which is not. In one embodiment, analyzing the scene 500 to identify desired subject matter for inclusion in and undesired subject matter to be excluded from, the to-be-transmitted video stream includes using an image segmentation method. The image segmentation method decomposes the scene 500 into its individual parts and stores information relating to the individual parts as background differentiation information 238 in the memory 224 of the controller 212.

Here, the image segmentation software is used to identify subject matter to be included in the foreground portion 501 and subject matter to be included in the background portion

503. Subject matter to be included in the foreground portion 501 typically includes the conference participant 302, objects connected to the conference participant 302, e.g., a chair 505, a headset 507, objects disposed in the hands of the conference participant 302, e.g., items to be displayed to remote viewers during the video-conferencing session, and/or objects disposed between the conference participant 502 and the camera device 200. Subject matter to be included in the background portion 503 typically includes objects or subjects found within the physical environment 300 that are not conference participants, connected to conference participants, or located between the conference participants and the camera device 200. For example, furniture, decor, structural components, e.g., doors and windows, pets, and/or other persons 510 who are not conference participants may be included in the background portion 503 and thus excluded from a to-be-transmitted video stream.

In some embodiments, the image segmentation software includes one or more algorithms that can be trained to better identify the individual parts of the scene, such as a machine-learning artificial intelligence (AI) algorithm and/or by use of a convolutional neural network.

Once the scene is analyzed, the relative locations of the desired and undesired subject matter with respect to the camera device 200, i.e., depth information, may be determined by comparing the segmented image to a depth map provided by the depth sensor 216 and/or the autofocus system 206. The desired depth of field thus includes the distance between the closest and farthest portions of the physical environment, which includes the desired subject matter and does not include the undesired subject matter.

In some embodiments, determining a desired depth of field includes determining the amount of defocus or blur desired for the background portion 503 to facilitate differentiation of the background portion 503 from the foreground portion 501. For example, in some embodiments, determining the desired depth of field includes comparing the size of a blur circles 312$a,b$, for points surfaces in the second portion 312, to a preset lower limit value. Here, the lower limit is based on a threshold contrast value used with the edge detection background differentiation methods described in activity 408. As discussed below, contrast values are based on a difference in intensity or brightness between adjacent pixels.

Figure 5A:
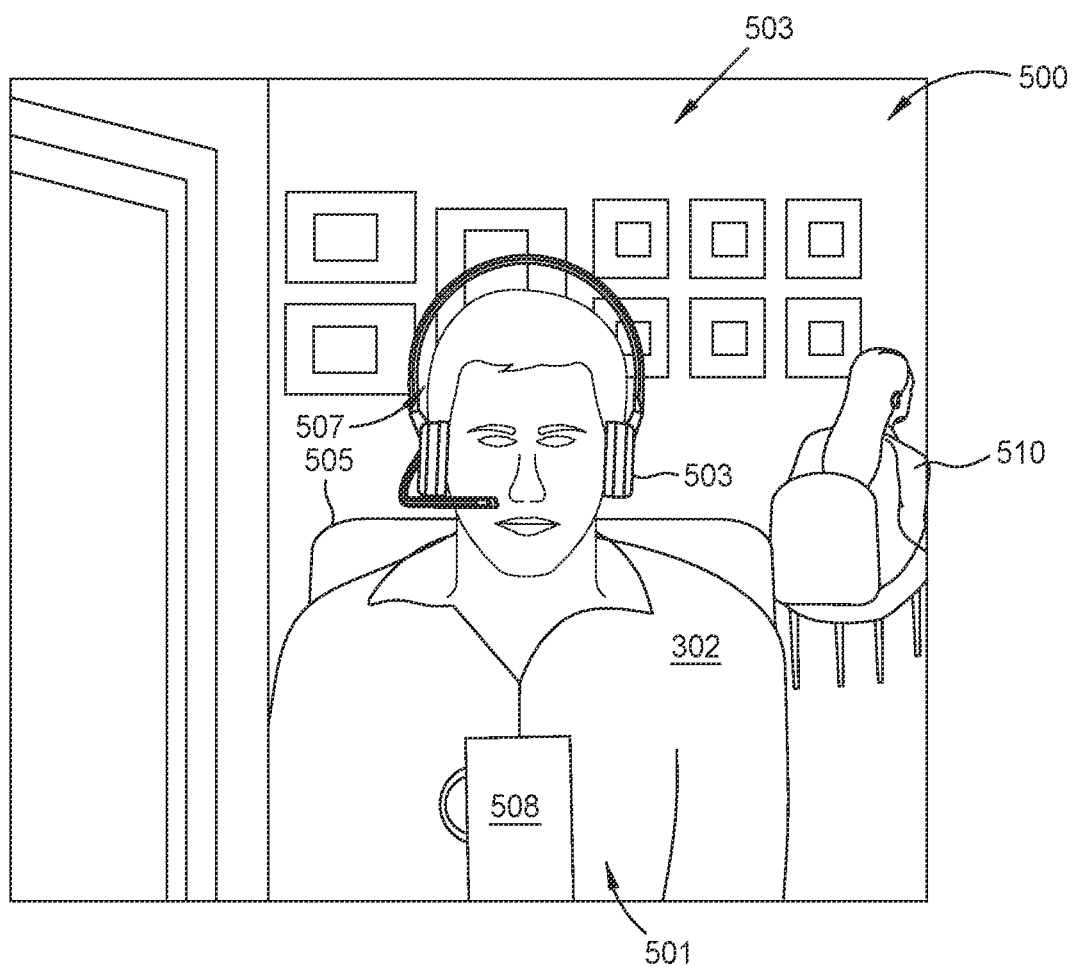
FIGS. 5A-5D are schematic representations of exemplary video data related to the video-conferencing methods illustrated herein, according to one embodiment.
Figure 5B:
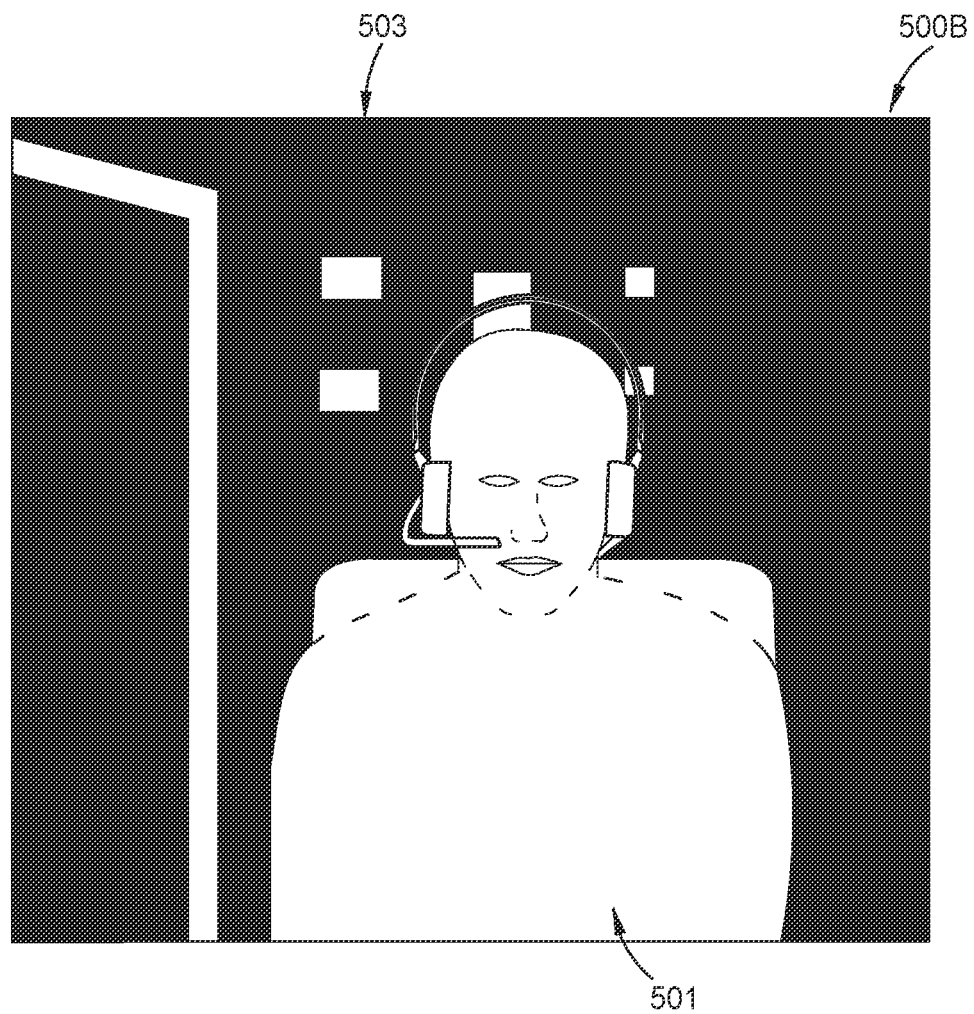

At activity 406, the method 400 includes acquiring, from the image sensor 202 of the camera device 200, video data of the physical environment 300 that includes a scene 500 (FIG. 5A). The acquired video data of the scene 500 includes the focused foreground portion 501 and the defocused second portion 503, which may be differentiated from one another using the difference in focus therebetween. Performing at least part of the differentiation using the AF processor 220 and the aperture adjustment assembly 208 before acquiring the video data beneficially reduces the computing power needed for the background removal and/or replacement schemes described below. For example, in some embodiments, a contrast between the focused edges of subject matter in the foreground portion 501 and the defocused edges of subject matter in the background portion 503 is used to detect the boundaries between the foreground portion 501 and the background portion 503 at activity 408.

At activity 408, the method 400 includes separating a first portion of the video data from a second portion. Here the first portion is of the first region 301 and corresponds to the foreground portion 501, and the second portion is of the second region 303 and corresponds to the background portion 503.

Separating the foreground portion 501 from the background portion 503 typically includes analyzing the video data to determine boundaries between the foreground portion 501 and the background portion 503 based on the difference in focus therebetween. Here, at least a portion of the boundaries comprises the edge of the foreground portion 501.

In some embodiments, separating the foreground portion 501 from the background portion 503 includes using an edge detection method to detect the peripheral edges of objects in the foreground portion 501. In some embodiments, at least portions of activity 408 are performed using one or more edge detection algorithms to determine the edges between the foreground portion 501 and the background portion 503 of the scene 500 and/or to filter the background portion 501 from the scene 500. For example, in some embodiments, the edge detection algorithm uses a binary mask (morphological image processing), a differentiation operator, such as the Prewitt, Sobel, or Kayyali operators, or a transform, such as a discrete Fourier transform, or a Laplacian transform. The one or more edge detection algorithms may be stored in the memory 224 of the camera device 200 as a software application 236.

Typically, in image processing, an edge is defined as a boundary between two regions having distinct gray level properties, i.e., pixels where the brightness or intensity thereof changes abruptly across the boundary region. In image processing applications, edge detection algorithms may be used to locate these abrupt changes in the detected pixel brightness and/or intensity. Defocusing the second region 303, e.g., by changing the depth of field 314$a,b$, at activity 404 desirably increases the difference in intensity of pixels across the interfacial regions (e.g., edge regions) of the foreground portion 501 and the background portion 503 to enable the edge detection algorithm to detect the boundaries therebetween. Beneficially, defocusing or blurring surfaces and objects in the background portion 503 alters the intensity of the pixels found at the boundaries therebetween. Thus, the edge detection algorithms herein are configured to detect the boundaries between the foreground portion 501 and the background portion 503 (e.g., areas having a large gradient in intensity across adjacent pixels) and exclude the less focused and blurry boundaries between objects and surfaces found entirely within the background portion 503 (e.g., areas having a smaller or shallower gradient in intensity across adjacent pixels).

In some embodiments, the edge detection algorithm is configured to detect edges having a desired sharpness and not detect edges that are more blurry and less focused using a threshold contrast value. The edge detection algorithm compares an actual contrast value to the threshold contrast value, where the actual contrast value is a difference in intensity or brightness between adjacent pixels. An edge is detected if the actual contrast value meets or exceeds the threshold contrast value, such as the sharp and in-focus edges of objects in the foreground portion 501. When the aperture 316$a,b$ is increased, the difference in intensity or brightness between adjacent pixels corresponding to edges in the second portion is relatively gradual due to the overlap of blur circles 330$a,b$ on the image sensor 202 and the increased size of the blur circles 330$a,b$ relative to the light-sensitive pixels 205 thereof. Thus, the actual contrast values across adjacent pixels of edges in the second portion 503 are less than the threshold contrast value allowing the edge detection algorithm to differentiate between the foreground portion 501 and the second portion 503.

In some embodiments, separating the foreground portion 501 from the background portion 503 includes generating instructions, for use by the controller 212 or the video streaming device 230, to extract the foreground portion 501 from the video data acquired from the image sensor 202. Here, the instructions exclude pixels corresponding to the undesired background portion 503 and include pixels corresponding to the desired foreground portion 501 by use of binary mask 500b,c, which contain pixel values of 0 and 1 respectively corresponding to the white region or the black region or vice versa.

Figure 5C:
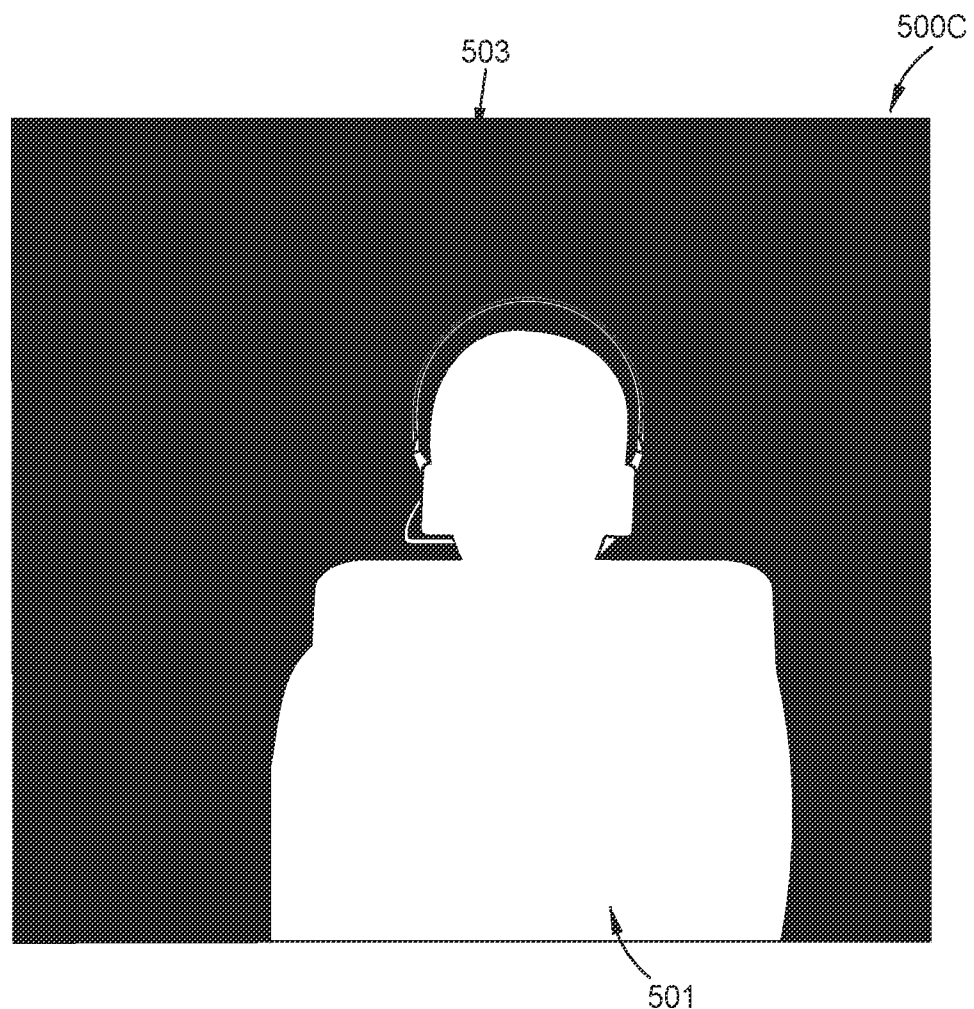

In some embodiments, interfacial edges of objects and surfaces contained within the defocused background portion 503 of the scene 500 are undesirably detected due to a high contrast therebetween. For example, as shown in FIG. 5C, the boundaries between a bright piece of artwork and a dark picture frame or a white door jam and a dark wall might be detected using the edge detection algorithm despite defocusing of the background portion 503. In those embodiments, it may be desirable to apply a rule, e.g., a contour thresholding rule, where white portions of the initial binary mask 500b having a continuous area that is less than a percentage of the total image are excluded from a final binary mask 500c. In some embodiments, the contour threshold is less than about 40%, such as less than about 35%, less than about 30%, less than about 25%, or less than about 20%.

In some embodiments, detected background portions 503, which are adjacent to the foreground portions 501, may form a continuous area with the foreground portion 501 in the initial binary mask 500b. In those embodiments, the software application 236 may apply an algorithm, such as the image segmentation method described above, to identify features of the continuous area that are typically associated with the background portion 503. For example, the identified features may include straight edges commonly associated with structural components, decor, and/or furniture, such as a door jam, a picture frame, or a dresser top, and thus typically not a video-conferencing participant. In those embodiments, the identified background features may be removed from the final binary mask 500c.

In some embodiments, detecting the edges which define the foreground portion 501 includes performing a discrete Fourier transform operation on a data set representing the scene 500 and filtering the transformed data using a high-pass filter. Performing a discrete Fourier transform operation on the scene 500 decomposes the scene 500 into its sine and cosine components, i.e., transforms the scene 500 from the spatial domain to the frequency domain. Generally, edges within the spatial domain have a relatively high corresponding frequency when compared to other non-edge portions of the scene 500. When edges of objects and surfaces in the background portion 503 are blurred, the corresponding frequency of those blurred edges is typically less than the frequency corresponding to the edges in the foreground portion 501.

The high-pass filter is applied to the transformed data to extract the frequencies corresponding to the edges defining the foreground portion 501. Typically, the high-pass filter has a lower threshold that is based on a difference between the relatively high frequency of edges defining the foreground portion 501 and the lower frequency of edges of subject matter found within the blurred background portion 503.

In some embodiments, separating the foreground portion 501 from the background portion 503 includes performing a discrete Fourier transform operation on the data set and applying the high-pass filter to the transformed data to extract substantially all of the foreground portion 501 therefrom. Generally, the difference in frequency used to determine the lower threshold for distinguishing between edges defining the foreground portion 501 or substantially all of the foreground portion 501 is based on the difference between the focus of the foreground portion 501 and the degree of blur in the background portion 503.

At activity 410, the method 400 includes encoding the separated first portion, e.g., the foreground portion 501, of the video data into a desired encoding format. Encoding the video data typically includes using the video streaming device 230 to change the raw video data comprising individual frames acquired at a desired frame rate, e.g., 30 frames per second, into a desired format, e.g., a mathematical formula which can be reduced to data and communicated between communicatively coupled devices. Encoding the video data may also include performing a video compression operation on the video data, using a video encoding and decoding (codec) protocol, to reduce the bandwidth required for transmission thereof.

Typically, the codec protocol includes one or more video compression algorithms, which may be used by the video streaming device 230 to reduce the bandwidth required for the transmission of an encoded video stream. Video compression algorithms typically look for spatial and temporal redundancies, such as unchanging background portions in consecutive images, which need not be encoded with every frame of the video stream and may instead be encoded periodically as a reference frame to facilitate interframe prediction encoding. For example, an interframe predictive codec may repeatedly use data corresponding to static pixels that do not change between frames in the video stream. The data corresponding to the static pixels does not need to be encoded in every frame and instead can be encoded periodically in reference frames to be provided for decoding. Thus, encoded frames other than the reference frames may contain dynamic pixels but typically do not include static pixels, which reduces the size thereof.

Dynamic pixels are those that change between frames and can indicate the motion of a subject contained therein and/or fluctuations of light and color within the image. The fluctuations of light and color may be caused by changes within the physical environment 300 or the result of random variation in the brightness and color information acquired from the image sensor 202, e.g., electrical noise. Often, electrical noise is a byproduct of electrical fluctuations caused by over-amplification in low light conditions. Typically, information corresponding to the dynamic pixels is included in each encoded frame so that a larger percentage of dynamic pixels in each frame, such as dynamic pixels caused by noise, causes a corresponding decrease in the available compression thereof. Examples of suitable codec protocols, which may be used with the methods herein include H.264, H.265, and VP9.

Here, the foreground portion 501 of the video data is encoded for transmission to the user device 110 at a desired equivalent resolution. The equivalent resolution is a percentage of the raw video data acquired from the whole of the image sensor 202 that may be otherwise be encoded for transmission to the user device 110. For example, if image sensor 202 of the camera device 200 is configured to provide a 3840p (4K) resolution video stream and the portion to-be-transmitted comprises about 75% of the video data acquired from the image sensor 202, a resulting equivalent resolution of 3840p (about 8,294,400 pixels for a 16:9 aspect ratio) would equal about 75% of 8,294,400 or about 6,226, 800 pixels. In some embodiments, the area of the foreground portion 501 is about 95% or less of an area of the raw video data acquired by the image sensor 202 (the total area), such about 90% or less, about 85% or less, about 80% or less, about 75% or less, about 70% or less, about 65% or less, about 60% or less, about 55% or less, or about 50% or less.

Pre-encoding separation of the foreground portion 501 desirably reduces the bandwidth requirements for post-encoding transmission of the video stream. Typically, for equivalent resolutions of the foreground portion 501 of a scene 500 acquired by the image sensor 202, a reduction in the bandwidth required to transmit an uncompressed foreground portion 501 is inversely proportional to the percentage of the area occupied by the foreground portion 501 in relation to the scene 500. For example, if the area percentage of the foreground portion 501 is about 75% of the area of the scene 500, the bandwidth required to transmit an uncompressed foreground portion 501 is reduced by about 25% when compared to the bandwidth required for uncompressed transmission of the entire scene 500.

For compressed video streams, the difference in bandwidth requirements for transmission of the foreground portion 501 and transmission of the entire scene 500 may be even more pronounced. This is because, as discussed above, changes in the background portion 503 caused by motion and variations in light and color, e.g., noise induced by low light conditions, registers as dynamic pixels, which limits the amount of compression available for reducing the bandwidth required to transmit the image. Separating the foreground portion 501 from the background portion 503 and removing and/or replacing the background portion 503 before compression beneficially removes unwanted dynamic pixels contained therein, thus increasing the available compression of the to-be-transmitted video stream.

Here, the first portion of the video data is encoded using the video streaming device 230 before the encoded video data is transmitted to a user device having a video-conferencing software application executing thereon. Separating the first portion of the video stream from the second portion of the video stream before encoding the raw video data for transmission beneficially avoids latencies that would otherwise accumulate if the method were to be performed on a device external to the camera device. Thus, in some embodiments, a delay between real-time and transmitting the separated first portion of the video stream to the user device 110 is about 120 milliseconds or less, such as about 100 milliseconds or less, about 80 milliseconds or less, about 60 milliseconds or less, about 50 milliseconds or less, about 40 milliseconds or less, or about 35 milliseconds or less, or about 30 milliseconds or less.

At activity 412, the method 400 includes transmitting the encoded video data to the user device 110. Activity 412 may be performed using the communications device 232.

Figure 5D:
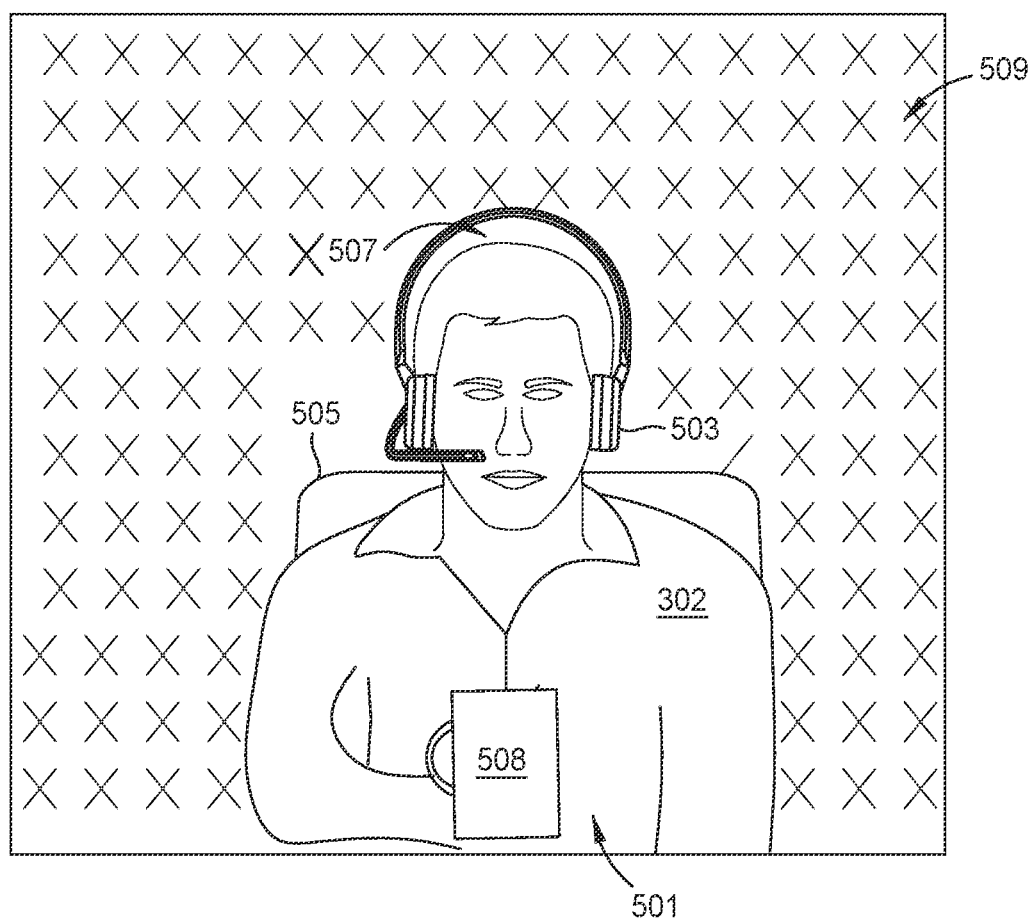

At activity 414, the method 400 optionally includes combining the separated first portion of the video data with a replacement background 509 (FIG. 5D). In some embodiments, the replacement background 509 comprises an image or a video stored in the memory of the camera device 200. Generally, in those embodiments, the first portion of the video data is combined with the replacement background image or video before the combined video data is encoded for transmission to the user device 110. In other embodiments, the replacement background is stored in a memory of the user device 110, and the first portion of the video data is combined therewith using a software application executing on the user device 110.

In some embodiments, the method 400 includes moving the first portion relative to the replacement background 509 when combing the video data therewith. For example, if the conference participant 302 is off-center within the frame, it may be desirable to center the conference participant 302 within the frame to improve the composition of the video stream. In some embodiments, centering the conference participant 302 in the frame and/or other alterations to the location of the foreground portion 501 relative to the boundaries of the frame includes applying one more composition rules as described in FIG. 7.

In some embodiments, aspects of the composition of the acquired image are saved as metadata in the memory 224 of the camera device 200. The metadata may be used by the camera device 200 or the user device 110 to provide a desired composition of the video stream to-be-displayed to a remote user. For example, in some embodiments, the metadata may include the amount of space occupied by the conference participant in a scene, the location of the conference participant in a scene, the direction the conference participant is facing, and/or the direction of the conference participants gaze with respect to the camera device.

In some embodiments, the metadata is used to facilitate enhancements to the first portion of the video data before or after the encoding thereof. Enhancements may include changing the composition of the first portion of the video data based on a comparison to one or more composition rules, such as described in the method 600 of FIG. 6 below. In some embodiments, the metadata is transmitted to the user device 110 to facilitate image enhancements using a software application executing thereon.

In some embodiments, the method 400 further includes using the camera device 200 to process one or both of the first portion (foreground portion 501) or the second portion (background portion 503) of the video data to control the transparency of an image produced therefrom. In those embodiments, the portion(s) of the video data are transmitted to a user device 110 and the desired transparency is provided by the presence of data or absence of data in the transmitted video stream.

In some embodiments, increasing the transparency of an image includes providing information on a desired opacity of individual pixels of the portion of video data by adding data to a to-be-transmitted video stream, e.g., by use of an alpha channel. For example, in some embodiments, each pixel may include three components, such as red, green, blue (rgb) components, and a fourth alpha component. Here, the alpha component comprises a value corresponding to a desired opacity of the pixel. In those embodiments, the alpha components corresponding to each pixel of the first or second portions collectively provide a transparency map, which may be transmitted to the user device 110 as an alpha channel. The alpha channel information may be used to combine one or both first or second portions of video data with the replacement background image 510 to provide a layered composite image, e.g., by use of alpha compositing.

Figure 6:
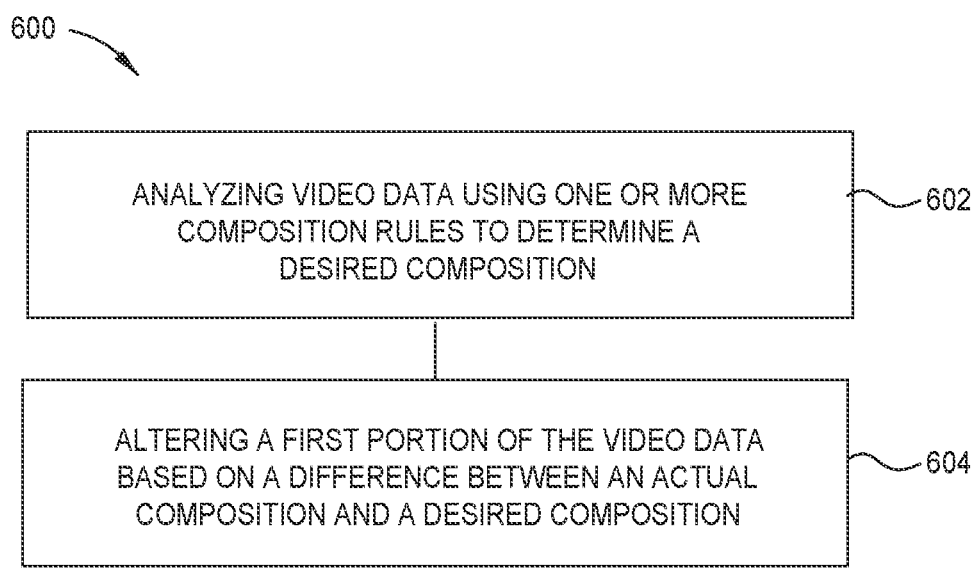
FIG. 6 is a diagram illustrating a video-conferencing method, according to another embodiment, which may be used with the camera device of FIG. 2.

FIG. 6 is a diagram illustrating a video-conferencing method 600, according to one embodiment, which may be performed using the camera device 200. Here, the method 600 is used to improve a remote viewer's experience by adjusting the composition of the video stream transmitted to the user device 110, where the video stream comprises a first portion, e.g., the foreground portion 501, of video data which is separated from a second portion, e.g., the background portion 503, of video data using the method 400 set forth in FIG. 4.

At activity 602 the method 600 includes analyzing video data acquired from an image sensor of a camera device using one or more compositions rules. Analyzing the video data may be performed before or after separating the first portion from the second portion and may be performed on the first portion, the second portion, or both.

Here, the one or more composition rules are based on general principles of photography, such as one or more of the negative space surrounding the one or more objects, the negative space between the one or more objects and the boundaries of the scene, the asymmetry of the location of the one or more objects within the scene, a direction one or more objects are facing within the scene, a depth of field between at least two objects, and a ratio of a depth to width of the physical environment relative to the camera device. When the objects are conference participants, the one or more composition rules may include any one of, or a combination of, negative space surrounding the one or more participants, negative space between the one or more participants, asymmetry of the location of the one or more participants within the scene, a direction one or more participants are facing within the scene, a depth of field between at least two participants, a ratio of a depth to width of the physical environment relative to the camera device, and the amount of space occupied by a conference participant within a scene.

At activity 604, the method 600 includes altering the first portion 301 based on a difference between an actual composition of the to-be-transmitted video stream and the desired composition.

The advanced camera devices and background differentiation schemes described above provide for pre-encoding and pre-compression background removal and/or replacement from a to-be-transmitted video stream. By providing for pre-compression and pre-crop background differentiation, the advanced camera devices herein desirably avoid accumulated latencies that would otherwise propagate with a background replacement software executing on an operating system of a user device separate from, but communicatively coupled to, the camera device. Removal of undesired background from the video stream at the camera device substantially reduces the bandwidth otherwise required for transmission of an unmodified video stream. The advanced camera devices, and background differentiation methods performed thereon, may be used with but are generally invisible to video-conferencing software applications, which advantageously facilitates seamless integration therewith.

While the foregoing is directed to embodiments of the present disclosure, other and further embodiments of the disclosure may be devised without departing from the basic scope thereof, and the scope thereof is determined by the claims that follow.

The invention claimed is:

1. A camera device for use with a video streaming system, the camera device comprising:
an image sensor;
a lens;
an aperture assembly operable to change an effective aperture of the lens; and
a controller having a first processor and comprising a non-transitory computer-readable medium that includes instructions which, when executed by the first processor, are configured to cause the camera device to perform a method, the method comprising:
acquiring, from the image sensor, video data of a physical environment;
separating a first portion of the video data from a second portion of the video data;
encoding the first portion to generate encoded video data; and
transmitting, by use of the first processor, a video stream comprising the encoded video data from the camera device to a computing device that is coupled to the camera device, wherein
the computing device and the camera device are discrete devices, and
the computing device comprises a second processor configured to cause the transmission of the encoded video data to a location remote from the camera device and computing device.

2. The camera device of claim 1, wherein
the first portion of the video data is a foreground portion corresponding to a first region of the physical environment,
the second portion is a background portion corresponding to a second region of the physical environment, and
the first region is closer to the camera device than is the second region.

3. The camera device of claim 2, further comprising:
focusing the camera device on a subject located in the first region of the physical environment, wherein the acquired video data comprises the subject that has a boundary that defines a portion of an edge of the first portion; and
defocusing, using the camera device, the second region, wherein the second portion is at least partially defined by the portion of the edge of the first portion.

4. The camera device of claim 3, wherein defocusing the second region comprises changing the effective aperture of the lens using the aperture assembly.

5. The camera device of claim 3, wherein separating the first portion of the video data from the second portion of the video data further comprises analyzing the video data to determine boundaries between the first and second portions based on a difference in focus therebetween, wherein at least a portion of the boundaries comprise the edge of the first portion.

6. The camera device of claim 5, wherein the difference in focus between the first and second portion comprises a difference in an intensity or brightness of pixels thereof.

7. The camera device of claim 5, wherein separating the first portion from the second portion comprises detecting an edge between the first and second portion based on the difference in intensity or brightness of pixels on either side of the edge.

8. The camera device of claim 5, wherein a delay between real-time and transmitting the video stream to the computing device is about 60 milliseconds or less.

9. The camera device of claim 1, further comprising:
combining the separated first portion with a replacement background stored in a memory of the camera device; and
encoding the replacement background with the separated first portion to generate the encoded video data.

10. The camera device of claim 3, wherein the subject is a video conference participant.

11. The camera device of claim 10, wherein the method further comprises:
generating metadata of one or more aspects of a composition of the acquired video data; and
transmitting the metadata to the computing device.

12. The camera device of claim 11, wherein the metadata includes an area occupied by the conference participant, a location of the conference participant relative to boundaries of the acquired video data, a direction the conference participant is facing, a direction of the conference participant's gaze with respect to the camera device, or combinations thereof.

13. The camera device of claim 1, wherein the method further comprises:
analyzing the first portion of the video data using one or more composition rules to determine a desired composition of a to-be-transmitted video stream; and
before encoding the first portion of the video stream, altering the first portion based on a difference between an actual composition of the to-be-transmitted video stream and the desired composition.

14. The camera device of claim 13, wherein the one or more composition rules are based on one or a combination of negative space surrounding one or more conference participants, negative space between the one or more conferencing participants and boundaries of the to-be-transmitted video stream, asymmetry of locations of the one or more conference participants within the boundaries of the to-be-transmitted video stream, a direction one or more of the conference participants are facing, a direction of the one or more conference participants gaze with respect to the camera device, or combinations thereof.

15. A computer-implemented method, comprising:
(a) focusing a camera device on a subject located within a first region of a physical environment to define a first potion of an image, wherein the subject has a boundary that defines a portion an edge of the first portion;
(b) defocusing, using the camera device, a second region of the physical environment to define a second portion of the image, wherein the first region is located between the second region and the camera device;
(c) acquiring video data of the physical environment comprising the first portion and the second portion;
(d) separating the first portion of the video data from the second portion of the video data;
(e) encoding the separated first portion of the video data to generate encoded video data; and
(f) transmitting, by use of a first processor, a video stream comprising the encoded video data to a computing device that is coupled to the camera device, wherein
the computing device and the camera device are discrete devices, and
wherein the camera device comprises a controller comprising a non-transitory computer-readable medium that includes instructions, which, when executed by the first processor, are configured to cause the camera device to perform (a)-(f), and
wherein the computing device comprises a second processor configured to cause the transmission of the encoded video data to a location remote from the camera device and computing device.

16. The computer-implemented method of claim 15, wherein separating the first portion of the video data from the second portion of the video data further comprises analyzing the video data to determine boundaries between the first and second portions based on a difference in focus therebetween, wherein at least a portion of the boundaries comprise the edge of the first portion.

17. The computer-implemented method of claim 16, wherein the difference in focus between the first and second portion comprises a difference in an intensity or brightness of pixels thereof.

18. The computer-implemented method of claim 15, wherein separating the first portion from the second portion comprises detecting an edge between the first and second portion based on the difference in intensity or brightness of pixels on either side of the edge.

19. The computer-implemented method of claim 15, wherein
the camera device includes a lens and an image sensor, and
focusing the camera device on the subject comprises moving one or both of the lens and the image sensor with respect to one another.

20. The computer-implemented method of claim 19, wherein
the camera device further comprises an aperture assembly operable to change an effective aperture of the lens, and
defocusing the second region comprises changing the effective aperture of the lens.

21. A camera device for use with a video streaming system, the camera device comprising:
an image sensor;
a lens;
an aperture assembly operable to change an effective aperture of the lens; and
a controller having a first processor and comprising a non-transitory computer-readable medium that includes instructions which, when executed by the first processor, are configured to cause the camera device to perform a method, the method comprising:
acquiring, from the image sensor, video data of a physical environment;
separating a first portion of the video data from a second portion of the video data;
encoding the first portion to generate encoded video data; and
transmitting, by use of the first processor, a video stream comprising the encoded video data from the camera device to a video conferencing device by use of a computing device that is coupled to the camera device and in communication with the video conferencing device, wherein the computing device comprises a second processor configured to cause the transmission of the encoded video data to the video conferencing device, and wherein the computing device and the camera device are discrete devices.

* * * * *